(12) United States Patent
Hirahara

(10) Patent No.: US 8,520,236 B2
(45) Date of Patent: Aug. 27, 2013

(54) PRINTING CONTROL APPARATUS AND PRINTING CONTROL METHOD

(75) Inventor: Akiko Hirahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 947 days.

(21) Appl. No.: 12/428,361

(22) Filed: Apr. 22, 2009

(65) Prior Publication Data

US 2009/0268221 A1    Oct. 29, 2009

(30) Foreign Application Priority Data

Apr. 23, 2008 (JP) ................................ 2008-112986

(51) Int. Cl.
- *G06F 3/12* (2006.01)
- *G06F 17/00* (2006.01)
- *H04N 1/36* (2006.01)
- *H04N 1/32* (2006.01)
- *H04B 1/00* (2006.01)

(52) U.S. Cl.
USPC ..... 358/1.15; 358/402; 358/442; 379/100.01; 705/408

(58) Field of Classification Search
USPC ............... 358/1.9, 1.15, 434, 440, 402, 442; 705/57, 77, 40, 44, 408, 411, 29, 34; 379/121.02, 114.03, 114.21, 114.26, 114.27, 379/114.28, 114.25, 93.22, 121.03, 127.03, 379/127.04, 142.05, 900, 905

See application file for complete search history.

(56) References Cited

U.S. PATENT DOCUMENTS

| | | | | |
|---|---|---|---|---|
| 2003/0025936 A1* | 2/2003 | Ouchi et al. | ................. | 358/1.15 |
| 2003/0088476 A1* | 5/2003 | Simpson et al. | ................ | 705/26 |
| 2004/0249733 A1* | 12/2004 | Clough et al. | ................... | 705/34 |
| 2007/0064265 A1* | 3/2007 | Silverbrook et al. | ......... | 358/1.15 |
| 2007/0182984 A1* | 8/2007 | Ragnet et al. | ................. | 358/1.15 |
| 2009/0198601 A1* | 8/2009 | Zwiefelhofer | ................... | 705/34 |
| 2009/0238599 A1* | 9/2009 | Kim | ............................... | 399/79 |
| 2010/0118345 A1* | 5/2010 | Minato | ........................ | 358/1.15 |
| 2011/0286016 A1* | 11/2011 | LaVigne et al. | .............. | 358/1.9 |

FOREIGN PATENT DOCUMENTS

| | | |
|---|---|---|
| JP | 2004-252709 A | 9/2004 |
| JP | 2004-362015 A | 12/2004 |

* cited by examiner

*Primary Examiner* — Madelein A Nguyen

(74) *Attorney, Agent, or Firm* — Canon USA Inc. IP Division

(57) ABSTRACT

A printing control apparatus includes a verification unit configured to verify a charging destination of a job generated at a client terminal apparatus. The printing control apparatus includes a control unit configured to suspend execution of the job if no value is set to the charging destination of the job or that an invalid value is set to the charging destination of the job. The printing control apparatus also includes a generation unit configured to generate an input screen for entering a value of the charging destination of the job if no value is set to the charging destination of the job or that an invalid value is set to the charging destination of the job. The printing control apparatus also includes a notification unit configured to notify information about the input screen generated by the generation unit to the client terminal apparatus.

15 Claims, 23 Drawing Sheets

FIG.9

```
☐  - Mailer
FILE(F)  EDIT(E)  VIEW(V)  MAIL(M)  TOOLS(T)  HELP(H)
┌─────────────────────────────────────────────────────────────────────┬──┐
│ SUBJECT                          SENDER          RECEIPT DATE AND TIME │▲│
│ [NOTICE] PLEASE ENTER MANAGEMENT CODE  BillingManager  2007/11/3 10:25:35 │ │
│                                                                       │ │
│                                                                       │ │
│                                                                       │▼│
└─────────────────────────────────────────────────────────────────────┴──┘
  SENDER: BillingManager<billingman@a-corporation.co.jp>
  SUBJECT: [NOTICE] PLEASE ENTER MANAGEMENT CODE
  RECEIPT DATE AND TIME: 2007/11/3 10:25:35
┌─────────────────────────────────────────────────────────────────────┬──┐
│                                                                       │▲│
│ PLEASE ACCESS THE FOLLOWING URL AND ENTER MANAGEMENT CODE.            │ │
│                                                                       │ │
│ http://accountserver.a-corporation.co.jp/userhome/00123456/bcinput/afaklhbvan1 │ │
│                                                                       │ │
│ [DOCUMENT INFORMATION]                                                │ │
│                                                                       │ │
│ DOCUMENT NAME: INSTRUCTION.doc                                        │ │
│ JOB OWNER NAME: Aya                                                   │ │
│ PRINTER NAME: Laser Printer 1230                                      │ │
│ JOB RECEIPT DATE AND TIME: 2007/11/3 10:25:35                         │ │
│                                                                       │▼│
│ ◄                                                                   ► │ │
└─────────────────────────────────────────────────────────────────────┴──┘
```

FIG.10

```
┌─────────────────────────────────────────────────────┐
│ ☐   - Mailer                                        │
├─────────────────────────────────────────────────────┤
│ FILE(F)  EDIT(E)  VIEW(V)  MAIL(M)  TOOLS(T)  HELP(H)│
├─────────────────────────────────────────────────────┤
│ SUBJECT                          SENDER         RECEIPT DATE AND TIME │
│ [NOTICE] PLEASE ENTER MANAGEMENT CODE   BillingManager   2007/11/3 10:25:35 │
└─────────────────────────────────────────────────────┘
```

SENDER: BillingManager<billingman@a-corporation.co.jp>
SUBJECT: [NOTICE] PLEASE ENTER MANAGEMENT CODE
RECEIPT DATE AND TIME: 2007/11/3 10:25:35

PLEASE ACCESS THE FOLLOWING URL AND ENTER MANAGEMENT CODE.

http://accountserver.a-corporation.co.jp/userhome/00123456/bcinput/list-12321245

[DOCUMENT INFORMATION]

NUMBER OF DOCUMENTS: 5
JOB OWNER NAME: Aya

FIG.11

| CLIENT JOB MANAGEMENT - Web Browser |
|---|
| FILE(F)  EDIT(E)  VIEW(V)  FAVORITES(A)  TOOLS(T)  HELP(H) |
| ADDRESS(D) http://accountserver.a-corporation.co.jp/userhome/00123456/bcinput |

CLIENT JOB MANAGEMENT

USER  [          ]
PASSWORD  [          ]

[LOGIN]

FIG.12

| SET MANAGEMENT CODE... - Web Browser |
|---|
| FILE(F)  EDIT(E)  VIEW(V)  FAVORITES(A)  TOOLS(T)  HELP(H) |
| ADDRESS(D) http://accountserver.a-corporation.co.jp/userhome/00123456/bcinput/afaklhbvan1 |

PLEASE ENTER MANAGEMENT CODE FOR THE FOLLOWING DOCUMENT.

DOCUMENT NAME: INSTRUCTION.doc

JOB OWNER NAME: Aya

PRINTER NAME: Laser Printer 1230

JOB RECEIPT DATE AND TIME: 2007/11/3 10:25:30

Client(1)  [DBG1234567 ▼]

Matter(2)  [089AB ▼]

Submatter(3)  [CD1 ▼]

[ OK ]  [ BACK ]

FIG.13

SET MANAGEMENT CODE... - Web Browser
FILE(F) EDIT(E) VIEW(V) FAVORITES(A) TOOLS(T) HELP(H)
ADDRESS(D) http://accountserver.a-corporation.co.jp/userhome/00123456/bcinput/list-1232124

PLEASE ENTER MANAGEMENT CODE FOR THE SELECTED DOCUMENT.

Client(1)    DBG1234567

Matter(2)    089AB

Submatter(3) CD1

OK    BACK

FIG.15

| MEMBER OF JOB J | INITIAL VALUE | VALUE |
|---|---|---|
| jobID: JOB ID | 1 | THE JOB ID IS PROVIDED BY INCREMENTING BY 1 IN GENERATING A UNIQUE ID AND A JOB CLASS INSTANCE WITH RESPECT TO EACH JOB. THE JOB MANAGEMENT UNIT USES THE JOB ID TO IDENTIFY A JOB IN THE JOB LIST. IN THE PRESENT EXEMPLARY EMBODIMENT, THE JOB CONTROL UNIT ALSO USES THE JOB ID TO IDENTIFY A JOB. IF DIFFERENT ANOTHER ID IS USED, THE ANOTHER ID IS STORED AS THE ID FOR SEPARATELY PROVIDED DIFFERENT ANOTHER MEMBER. |
| status: STATUS OF PROCESSING OF JOB | NEW | NEW: A NEW JOB IS TO BE REGISTERED. INPUT_WAITING: THE JOB IS WAITING FOR A MANAGEMENT CODE TO BE INPUT. EXECUTE_WAITING: THE JOB IS WAITING FOR ITS EXECUTION |
| mailCount: NUMBER OF TIMES OF TRANSMITTING MAIL | 0 | INDICATES THE NUMBER OF TIMES OF TRANSMITTING A MAIL TO CLIENT. THE VALUE IS INCREMENTED BY 1 EVERY TIME A MAIL IS TRANSMITTED. |
| mailTime: TIME OF TRANSMISSION OF LAST MAIL | NULL | INDICATES THE DATE AND TIME OF TRANSMISSION OF LAST MAIL TO CLIENT. WHETHER TO RETRANSMIT THE MAIL IS DETERMINED BASED ON THE DATE AND TIME OF TRANSMISSION OF LAST MAIL AND THE PRESENT TIME. |
| jobInfo: JOB INFORMATION<br>kind: JOB TYPE<br>ownerName: JOB OWNER NAME<br>submittedTime: RECEIVING DATE AND TIME<br>documentName: DOCUMENT NAME<br>deviceName: DEVICE NAME<br>billingCode: MANAGEMENT CODE | SET BY ANALYZING RECEIVED JOB | JOB TYPE: PRINT, COPY, SCAN, FAX, ETC.<br>JOB OWNER NAME: THE USER WHO EXECUTES THE JOB<br>THE JOB RECEIVING DATE AND TIME: THE DATE AND TIME OF RECEIVING THE JOB. THE JOB RECEIVING DATE AND TIME CAN BE SUBSTITUTED BY THE JOB GENERATION DATE AND TIME.<br>DOCUMENT NAME: THE NAME OF THE DOCUMENT<br>THE DEVICE NAME: THE NAME OF THE DEVICE THAT PROCESSES THE JOB, SUCH AS THE PRINTER OR THE MFP<br>MANAGEMENT CODE: THE DATA USED FOR CHARGING. THE MANAGEMENT CODE IS AN ATTRIBUTE INPUT BY THE USER. FURTHERMORE, THE MANAGEMENT CODE IS AN EXEMPLARY EMBODIMENT OF AN ATTRIBUTE NECESSARY TO BE INPUT BY THE USER. |
| userInfo: USER INFORMATION<br>mailAddress: MAIL ADDRESS<br>userFullName: USER NAME, ETC. | NULL | THE USER INFORMATION IS ACQUIRED BY THE USER INFORMATION ACQUISITION UNIT ACCORDING TO THE JOB OWNER NAME. THE INFORMATION NECESSARY TO GENERATE A MAIL IS ACQUIRED AND STORED WHEN THE MAIL IS TRANSMITTED TO THE USER FOR THE FIRST TIME. THE USER INFORMATION AT LEAST INCLUDES THE MAIL ADDRESS OF THE USER AND THE NAME OF THE USER TO BE DESCRIBED IN THE MAIL. |

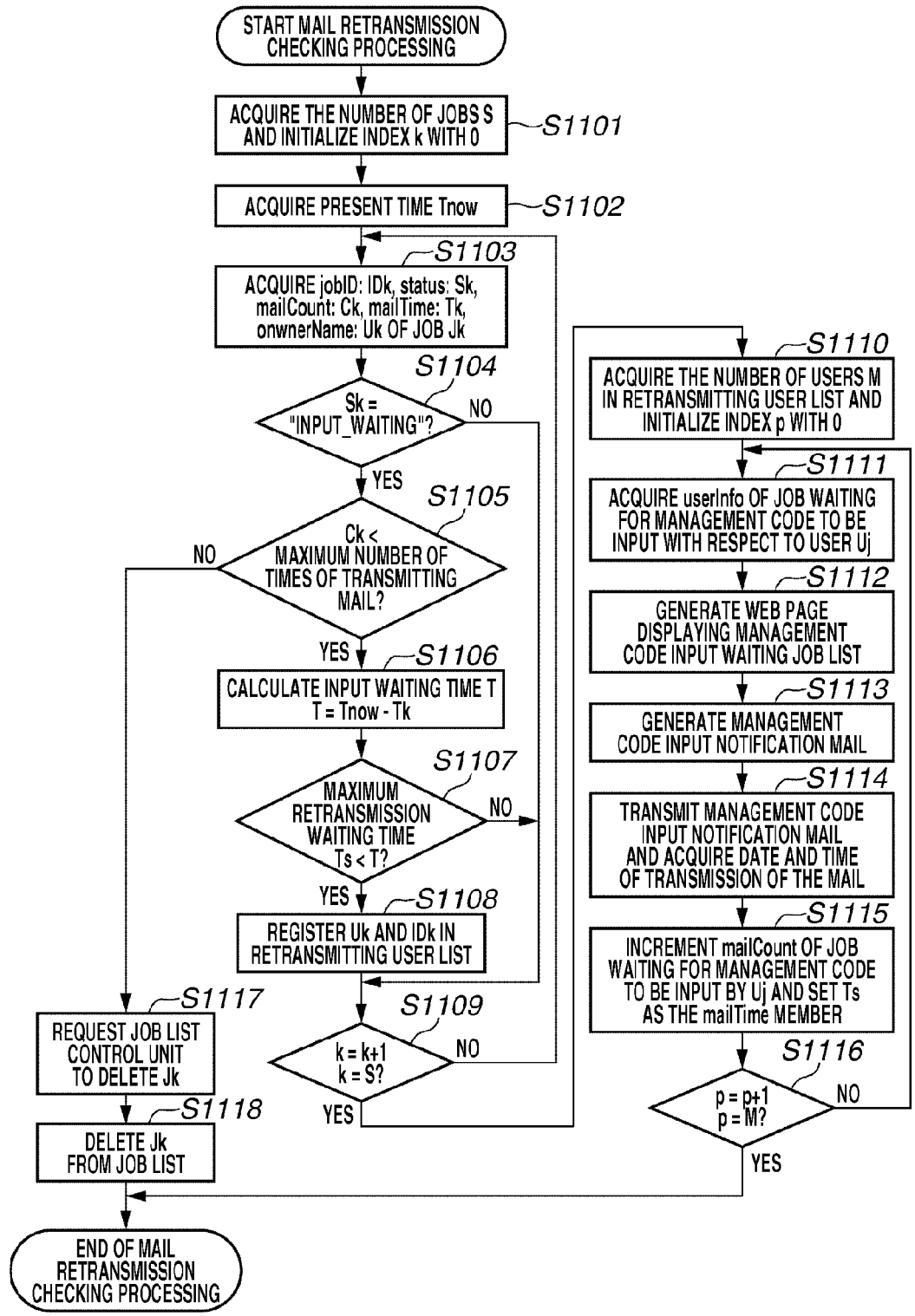

FIG.17

| \<header colspan> | | | | | | |
|---|---|---|---|---|---|---|
| LIST OF MANAGEMENT CODE INPUT WAITING JOBS - Web Browser ||||||||

| LIST OF MANAGEMENT CODE INPUT WAITING JOBS - Web Browser |
|---|
| FILE(F) EDIT(E) VIEW(V) FAVORITES(A) TOOLS(T) HELP(H) |
| ADDRESS(D) http://accountserver.a-corporation.co.jp/userhome/00123456/bcinput |
| MENU TOP > MANAGEMENT CODE INPUT WAITING JOB LIST    LOGIN USER NAME: Aya |
| MANAGEMENT CODE INPUT WAITING JOB LIST    TO MENU TOP |

THE MANAGEMENT CODE INPUT WAITING JOB LIST IS DISPLAYED BELOW.
PLEASE SELECT ONE OR MORE JOBS AND ENTER MANAGEMENT CODE.

| SELECT ALL | CANCEL ALL | DELETE JOB | ENTER MANAGEMENT CODE | UPDATE TO LATEST INFORMATION | JOB: 1-4/4 |
|---|---|---|---|---|---|

| | DOCUMENT NAME | DEVICE NAME | USER NAME | JOB TYPE | JOB RECEIVING DATE AND TIME | STATUS |
|---|---|---|---|---|---|---|
| ☑ | INSTRUCTIONS.doc | Laser Printer 1230 | Aya | PRINT | 2007/11/3 10:25:30 | WAITING FOR MANAGEMENT CODE TO BE INPUT |
| ☐ | LIST OF MATTERS.txt | Laser Printer 3210 | Aya | PRINT | 2007/11/3 10:25:59 | WAITING FOR MANAGEMENT CODE TO BE INPUT |
| ☐ | OPERATION MANUAL.doc | Laser Printer 1230 | Aya | PRINT | 2007/11/3 10:27:01 | WAITING FOR MANAGEMENT CODE TO BE INPUT |
| ☐ | SPECIFICATION FORM LIST.doc | Laser Printer 3210 | Aya | PRINT | 2007/11/3 10:28:33 | WAITING FOR MANAGEMENT CODE TO BE INPUT |

TO MENU TOP

FIG.22

| SET MANAGEMENT CODE... - Web Browser |
|---|
| FILE(F) EDIT(E) VIEW(V) FAVORITES(A) TOOLS(T) HELP(H) |
| ADDRESS(D) http://accountserver.a-corporation.co.jp/userhome/00123456/top |
| MENU TOP                                                          LOGIN USER NAME: Aya |
| LIST OF MENUS |
| <br>MANAGEMENT CODE INPUT WAITING JOB LIST >><br>   YOU CAN ENTER JOB MANAGEMENT CODE.<br>LIST OF JOB TO BE EXECUTED >><br>   YOU CAN DISPLAY THE LIST OF CANDIDATES OF JOBS TO BE EXECUTED.<br>JOB HISTORY LIST >><br>   YOU CAN DISPLAY THE JOB HISTORY AS A LIST.<br><br> |

FIG.24

| | JOB LIST - Web Browser | | | | | |
|---|---|---|---|---|---|---|
| | FILE(E) EDIT(E) VIEW(V) FAVORITES(A) TOOLS(T) HELP(H) | | | | | |
| | ADDRESS(D) http://accountserver.a-corporation.co.jp/userhome/00123456/joblist | | | | | |
| | MENU TOP > LIST OF JOBS TO BE EXECUTED | | | | LOGIN USER NAME: Aya | |
| | LIST OF JOBS TO BE EXECUTED | | | | TO MENU TOP | |

THE JOBS TO BE EXECUTED IS LISTED AS BELOW.
YOU CAN SELECT ONE OR MORE JOBS, DELETE A JOB, OR ENTER A MANAGEMENT CODE FOR THE SELECTED JOB.

| SELECT ALL | CANCEL ALL | DELETE JOB | ENTER MANAGEMENT CODE | UPDATE TO LATEST INFORMATION | | JOB: 1-9/9 |

| | DOCUMENT NAME | DEVICE NAME | USER NAME | JOB TYPE | JOB RECEIVING DATE AND TIME | STATUS |
|---|---|---|---|---|---|---|
| ☐ | MONTHLY SALES CHART.xls | Laser Printer 1230 | Aya | PRINT | 2007/11/3 9:25:03 | IN EXECUTION |
| ☐ | MONTHLY SALES CHART.xls | Laser Printer 1230 | Aya | PRINT | 2007/11/3 9:25:03 | WAITING FOR EXECUTION |
| ☐ | MONTHLY SALES CHART.xls | Laser Printer 1230 | Aya | PRINT | 2007/11/3 9:25:03 | WAITING FOR EXECUTION |
| ☐ | MONTHLY SALES CHART.xls | Laser Printer 1230 | Aya | PRINT | 2007/11/3 9:25:03 | WAITING FOR EXECUTION |
| ☐ | MONTHLY SALES CHART.xls | Laser Printer 1230 | Aya | PRINT | 2007/11/3 9:25:03 | WAITING FOR EXECUTION |
| ☑ | INSTRUCTIONS.doc | Laser Printer 1230 | Aya | PRINT | 2007/11/3 10:25:30 | WAITING FOR MANAGEMENT CODE TO BE INPUT |
| ☑ | LIST OF MATTERS.txt | Laser Printer 3210 | Aya | PRINT | 2007/11/3 10:25:59 | WAITING FOR MANAGEMENT CODE TO BE INPUT |
| ☑ | OPERATION MANUAL.doc | Laser Printer 1230 | Aya | PRINT | 2007/11/3 10:27:01 | WAITING FOR MANAGEMENT CODE TO BE INPUT |
| ☑ | SPECIFICATION FORM LIST.doc | Laser Printer 3210 | Aya | PRINT | 2007/11/3 10:28:33 | WAITING FOR MANAGEMENT CODE TO BE INPUT |

TO MENU TOP

PRINTING CONTROL APPARATUS AND PRINTING CONTROL METHOD

BACKGROUND OF THE INVENTION

1. Field of the Invention

The present invention relates to a printing control apparatus and a printing control method configured to execute processing for charging a fee for a job.

2. Description of the Related Art

A conventional job management system manages a job log acquired by counting the fee for a job, such as a print job, a scan job, or a facsimile transmission job. In the job management system, a user can designate information about a charging destination used for counting the actual fee in executing a job. Furthermore, such a job management system can designate a user or a user group (a group to which the user belongs) that is a target of counting the number of pages processed in a job. The target of counting (a group to which the user belongs, for example) and the information about the charging destination may not always match each other.

For example, Japanese Patent Application Laid-Open No. 2004-362015 discusses a method for easily charging a distribution destination for a print product when a print request source and the distribution destination of a resulting print product differ from each other. The method discussed in Japanese Patent Application Laid-Open No. 2004-362015 enables a print requesting user to designate a charging destination. The method allows the print requesting user to change information about the print requesting user, who is a target of charging of a job included in a print history (job log) after the requested printing has been completed, into information about a print product distribution destination, according to the authority of the print requesting user.

Generally, the charging destination information is previously set for a job as job information. After the job has been completed, the charging destination information is stored as a job log. The charging destination information is the data designated by a user and is stored in the job log as described above. The job log includes the other data stored as a result of executing a job. The data may include a document name, a print user name (a print requesting user name), the number of pages to be printed, color mode, designation on two-sided/one-sided printing, aggregate print, paper size, printing date and time, and paper type in the case of a print job by way of example. A user cannot change or delete the other data stored as a result of executing a job.

In using the charging destination information described above, it may be necessary that the job management system includes a user interface (UI) to allow the user to enter and designate a parameter value thereon. In a conventional method, a user can enter a parameter value via a UI of a printer driver.

Japanese Patent Application Laid-Open No. 2004-252709 discusses a method for verifying a setting value for charging each group, which is set for a print job, before transmitting a print job from a client apparatus to a printing apparatus. The method discussed in Japanese Patent Application Laid-Open No. 2004-252709 displays a UI that displays a warning message to a user and enables the user to enter a setting value thereon if it is determined that the setting value for charging each group set for a print job does not match the setting value managed on the printing apparatus.

However, the charging destination information is input after generating a print job and before transmitting the print job to the printing apparatus. Accordingly, it is necessary to provide an input screen according to the client environment.

In this regard, client apparatuses may use various different operating systems (OSs). Accordingly, development costs for providing a client environment according to each platform may become very high. Moreover, if a designation method uniquely set for each platform is used in each client environment, a job that has been generated without using the designation method may be transmitted to a printing apparatus or a printing control apparatus such as a print server.

SUMMARY OF THE INVENTION

The present invention is directed to a method for allowing a user to appropriately enter charging information of a job regardless of the platform of a client terminal apparatus.

According to an aspect of the present invention, a printing control apparatus includes a verification unit configured to verify a charging destination of a job generated at a client terminal apparatus. The printing control apparatus also includes a control unit configured to suspend execution of the job if it is determined by the verification unit that no value is set to the charging destination of the job or that an invalid value is set to the charging destination of the job. The printing control apparatus also includes a generation unit configured to generate an input screen for entering a value of the charging destination of the job if it is determined by the verification unit that no value is set to the charging destination of the job or that an invalid value is set to the charging destination of the job. The printing control apparatus also includes a notification unit configured to notify information about the input screen generated by the generation unit to the client terminal apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 9 illustrates an example of a notification e-mail according to an exemplary embodiment of the present invention.

FIG. 10 illustrates an example of a notification e-mail according to an exemplary embodiment of the present invention.

FIG. 11 illustrates an example of an authentication screen according to an exemplary embodiment of the present invention.

FIG. 12 illustrates an example of a management code setting screen according to an exemplary embodiment of the present invention.

FIG. 13 illustrates an example of a management code setting screen according to an exemplary embodiment of the present invention.

FIG. 15 illustrates an example of a member of an instance of a job class (job J) according to an exemplary embodiment of the present invention.

FIG. 16 is a flow chart illustrating an example of e-mail re-transmission checking processing according to an exemplary embodiment of the present invention.

FIG. 17 illustrates an example of a management code input waiting job list screen according to an exemplary embodiment of the present invention.

FIG. 22 illustrates an example of a menu list screen according to a third exemplary embodiment of the present invention.

FIG. 24 illustrates an example of a job list (executed job list) screen according to the third exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
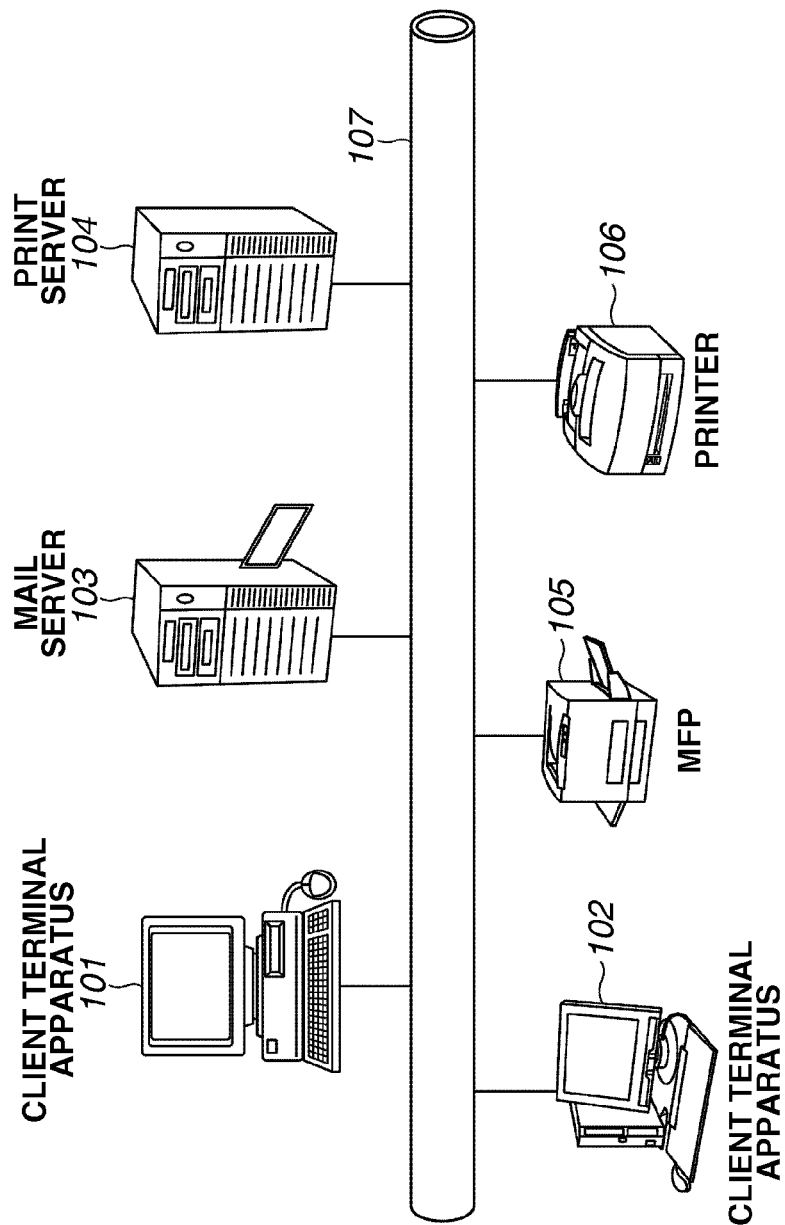
FIG. 1 illustrates an exemplary system configuration of a job management system according to an exemplary embodiment of the present invention.

FIG. 1 illustrates an exemplary system configuration of a job management system according to an exemplary embodiment of the present invention. Referring to FIG. 1, each client terminal apparatuses (information processing apparatuses) 101 and 102 is a personal computer (PC), for example. The client terminal apparatuses 101 and 102 can execute various programs such as a mailer (mailing software) and a browser.

Each of the client terminal apparatuses 101 and 102 is connected to a network 107 via a network cable such as Ethernet® or a public telephone line. The network 107 is a local area network (LAN), a wide area network (WAN), or the Internet.

The client terminal apparatuses 101 and 102 activate the browser after activating the mailer and receiving the e-mail including information about a charging destination. A user can input appropriate setting values via the browser to set charging destination information for a job on a device such as an MFP (printing control apparatus) 105, a printer (printing control apparatus) 106, or a print server 104.

In the example illustrated in FIG. 1, a plurality of client terminal apparatuses 101 and 102 is provided. However, the present invention is not limited to this. One or more client terminal apparatuses are possible.

An e-mail server 103 is an information processing apparatus that implements an e-mail sending and receiving function according to the present exemplary embodiment. The e-mail server 103 connects to the network 107.

The print server 104 is an information processing apparatus that receives and manages a job such as a FAX job or a print job from the client terminal apparatuses 101 and 102 and transmits the received job to the device. The print server 104 connects to the network 107. In the present exemplary embodiment, the job management system includes the print server 104, but the print server 104 is not always necessary.

The MFP 105 is a device having a plurality of functions such as a print function, a scan function, and a copy function. The printer 106 is an image processing apparatus. Both the MFP 105 and the printer 106 analyze a job (a print request, for example) transmitted from the client terminal apparatuses 101 and 102 and execute the requested processing. The printer 106 may include an electrophotographic laser printer, an inkjet printer, or a thermal transfer type printer.

Each of the client terminal apparatuses 101 and 102, the e-mail server 103, and the print server 104 is a common and general information processing apparatus. A mailer for transmitting a notification and a program of a browser, via which a user can enter charging destination information, are stored and executed on the client terminal apparatuses 101 and 102. The MFP 105 or the printer 106 may store and execute a job management program used for processing for managing a job.

Figure 2:
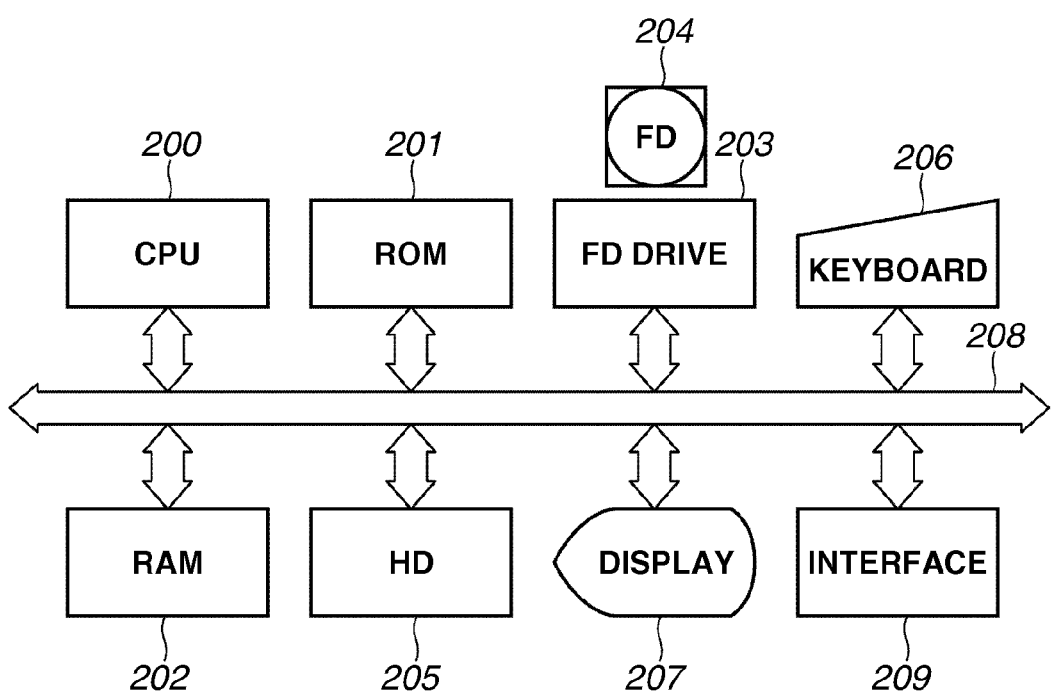
FIG. 2 illustrates an exemplary hardware configuration of an information processing apparatus according to an exemplary embodiment of the present invention.

FIG. 2 illustrates an exemplary hardware configuration of the information processing apparatus according to an exemplary embodiment of the present invention. The client terminal apparatuses 101 and 102, the e-mail server 103, and the print server 104, each of which being an example of the information processing apparatus, have the same or similar hardware configuration. FIG. 2 illustrates an exemplary configuration of each of the client terminal apparatuses 101 and 102, the e-mail server 103, and the print server 104.

Referring to FIG. 2, a central processing unit (CPU) 200 is a control unit of the information processing apparatus. The CPU 200 executes an application program, an operating system (OS), and the job management program stored on a hard disk (HD) 205. The CPU 200 executes control for temporarily storing information and a file necessary for executing a program on the RAM 202.

A read-only memory (ROM) (storage unit) 201 stores a program such as a basic input/output (I/O) program. A random access memory (RAM) 202, which is a temporary storage unit, functions as a main memory and a work area of the CPU 200. A flexible disk (FD) drive 203 is a storage medium reading unit. As will be described in detail below with reference to FIG. 6, a program stored on a FD (storage medium) 204 can be loaded on the computer system via the FD drive 203. The storage medium is not limited to the FD 204. An arbitrary storage medium such as a compact disc-read only memory (CD-ROM), a CD-recordable (CD-R), a CD-rewritable (CD-RW), a PC card, a digital versatile disc (DVD), an integrated circuit (IC) memory card, a magneto-optical disk (MO), or a memory stick can be used as the storage medium.

The FD 204 is a storage medium storing a computer-readable program. The HD 205 is an external storage unit that functions as a large capacity memory. The HD 205 stores a related program of the application program, the OS, and the job management program. A keyboard 206 is an instruction input unit. A user may issue various instructions via the keyboard 206 such as an instruction for printing a document and an instruction for setting charging destination information of a job to the client terminal apparatuses 101 and 102.

A display 207, which is a display unit, displays alternatives of a user instruction via the keyboard 206, a setting screen, and acquired information. A system bus 208 is a data bus used for data communication executed within the information processing apparatus (the client terminal apparatuses 101 and 102, the e-mail server 103, and the print server 104). An interface 209, which is an input/output unit, is used for data communication between the information processing apparatus and an external apparatus.

Figure 3:
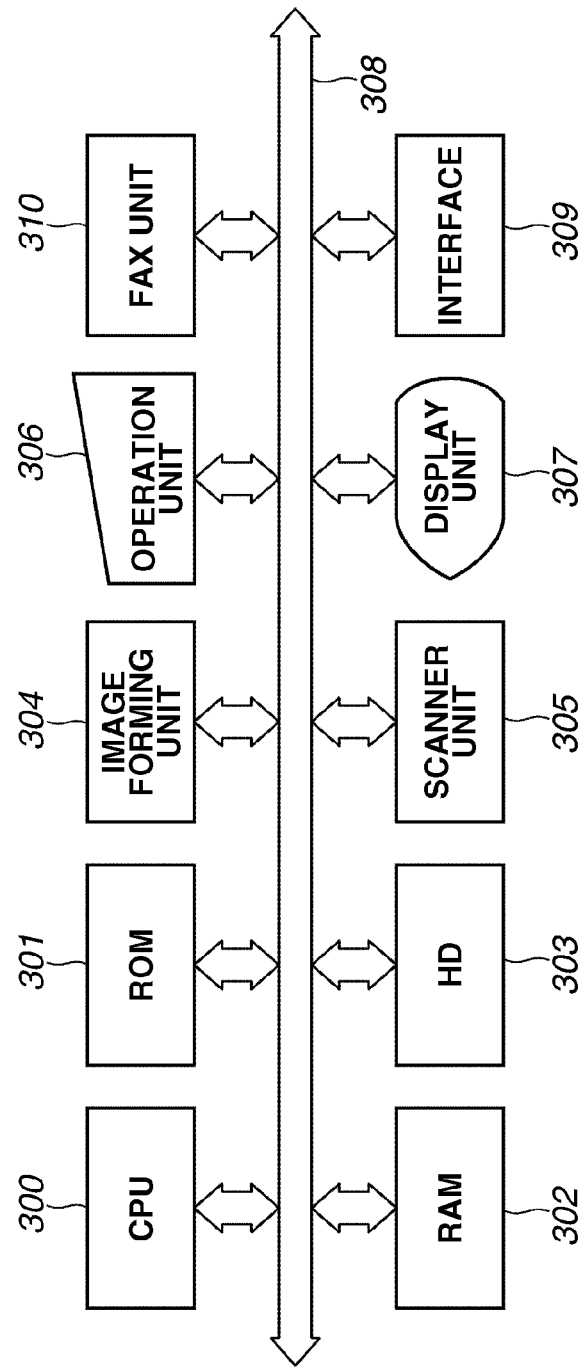
FIG. 3 illustrates an exemplary hardware configuration of a multifunction peripheral (MFP) and a printer, which are examples of an image processing apparatus according to an exemplary embodiment of the present invention.

FIG. 3 illustrates an exemplary hardware configuration of the MFP 105 and the printer 106, which are examples of an image processing apparatus according to an exemplary embodiment of the present invention. The MFP 105 and the printer 106 have substantially the same configuration except that the printer 106 does not have a scanner unit and a FAX transmission unit. The image processing apparatus is an example of the information processing apparatus.

Referring to FIG. 3, a CPU 300 controls the entire operation of the image processing apparatus. The CPU 300 executes a print control program, an application program, the OS, and the job management program stored on an HD 303. The CPU 300 executes control for, temporarily storing information and a file necessary to execute the program on a RAM 302.

A ROM 301, which is a storage unit, stores a program such as a device control program and a basic input/output (I/O) program. The RAM 302, which is a temporary storage unit, functions as a main memory and a work area of the CPU 300. The HD 303, which is an external storage unit, functions as a large capacity memory. The HD 303 stores the application program, the OS, the job management program, and related data.

The image forming unit 304 is activated when raster data that has been stored on the HD 303 as spooled data is transferred on the RAM 302. The image forming unit 304 forms an image according to the raster data read from the RAM 302.

The power to the RAM 302 is supplied from a battery (not illustrated). The RAM 302 can store a job log of a print job, a scan job, and a FAX job executed by each user as necessary. However, the temporary storage unit according to the present exemplary embodiment is not limited to the RAM 302. A different non-volatile memory such as an electrically erasable programmable ROM (EEPROM) can be used instead of the RAM 302.

A print job transmitted via an interface 309 and a system bus 308 is an example of a job transmitted from the client terminal apparatuses 101 and 102. The CPU 300 analyzes a print request. The print job is rasterized on the RAM 302 as raster data according to a result of the analysis. The raster data is loaded from the RAM 302 on the HD 303 as spooled data.

An operation unit 306, which is an instruction input unit, can be operated by the user to input various instructions on the image processing apparatus. A display unit 307 displays a setting screen and acquired information on the operation unit 306. The system bus 308 is a data bus used for data communication executed within the image processing apparatus. The interface 309, which is an input/output unit, is used for data communication between the image processing apparatus and an external apparatus.

A scanner unit 305 scans a paper document or the like with light and generates scan data of the document by reading reflection light from the scanned document with a sensor. The scanner unit 305 transmits the generated scan data to the HD 303 or the RAM 302, according to the purpose of use of the data. A FAX transmission unit 310 transmits and receives FAX data via the interface 309.

The MFP 105 includes the scanner unit 305 and the FAX transmission unit 310 but the printer 106 does not. Accordingly, when the printer 106 is used, charging destination information can be set only to a print job while charging destination information can be set to a print job, a scan job, a copy job, and a FAX job when the MFP 105 is used.

Figure 4:
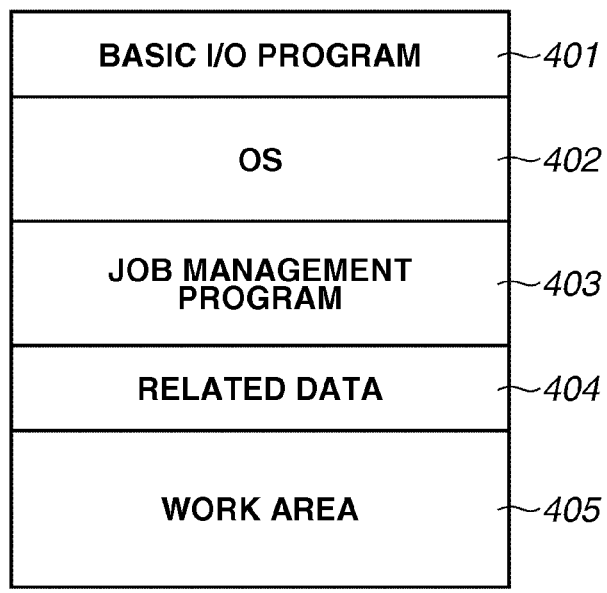
FIG. 4 illustrates an exemplary memory map of a random access memory (RAM) of the information processing apparatus and the image processing apparatus according to an exemplary embodiment of the present invention.

FIG. 4 illustrates an exemplary memory map of a RAM of the information processing apparatus and the image processing apparatus according to the present exemplary embodiment. In FIG. 4, an example of a memory map of a RAM when the job management program is loaded on the RAM and is ready to be executed is illustrated.

Referring to FIG. 4, when the apparatus is powered on, an OS 402 is read from the HD on the RAM. A basic I/O program area 401 stores a program having an initial program loading (IPL) function for starting the operation of the OS 402. A job management program 403 and related data 404, which is related to the job management program 403 or the like, are stored in an area of the RAM. A work area 405 is an area on which the CPU executes the job management program 403.

The CPU can load the job management program 403 and the related data 404 directly from a storage medium such as a FD on the RAM. However, the present exemplary embodiment is not limited to this. The CPU can load the job management program 403 and the related data 404 by any other appropriate method. The CPU may load the job management program 403 from the HD, on which the job management program 403 has already been installed, onto the RAM every time the job management program 403 is executed.

The storage medium storing the job management program 403 is not limited to the FD. A CD-ROM, a CD-R, a PC card, a DVD, or an IC memory card can be used as the storage medium storing the job management program 403. It is also useful if the job management program 403 is stored on the ROM as a part of the memory map and the CPU directly executes the job management program 403. Software that can implement the same function as that of the above-described units and devices can be used instead of the above-described hardware.

Figure 5:
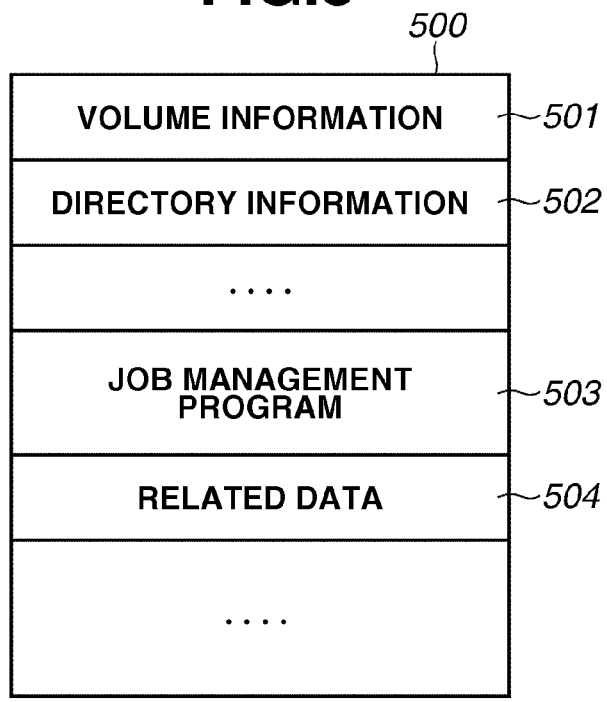
FIG. 5 illustrates an exemplary memory map of a storage medium such as a flexible disk (FD) according to an exemplary embodiment of the present invention.

FIG. 5 illustrates an exemplary memory map of a storage medium such as the FD 204 according to the present exemplary embodiment. Referring to FIG. 5, data 500 is stored on the storage medium. The data 500 includes volume information 501, which indicates information about the data 500, directory information 502, job management program 503, and related data 504, which is related data of the job management program 503. The job management program 503 is a program including processing according to the present exemplary embodiment performed according to a flow chart described below.

Figure 6:
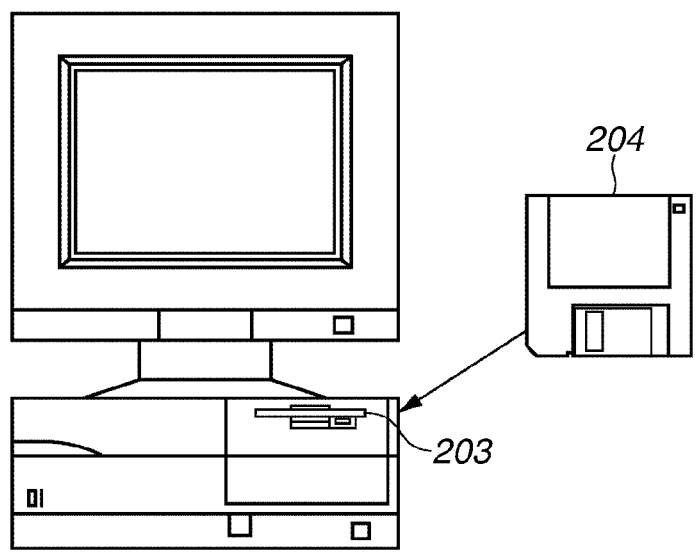
FIG. 6 illustrates an example of the relationship between an FD drive and an FD, which is inserted therein.

FIG. 6 illustrates an example of the relationship between the FD drive 203 and the FD 204. The FD 204 is inserted into the FD drive 203, according to the present exemplary embodiment. Referring to FIG. 6, the FD 204 stores the job management program 503 and the related data 504. As described in detail below with reference to FIG. 21, when a job management function is implemented on the print server 104, the job management program 503 and the related data 504 are installed on the print server 104 by using a storage medium such as the FD 204.

Figure 7:
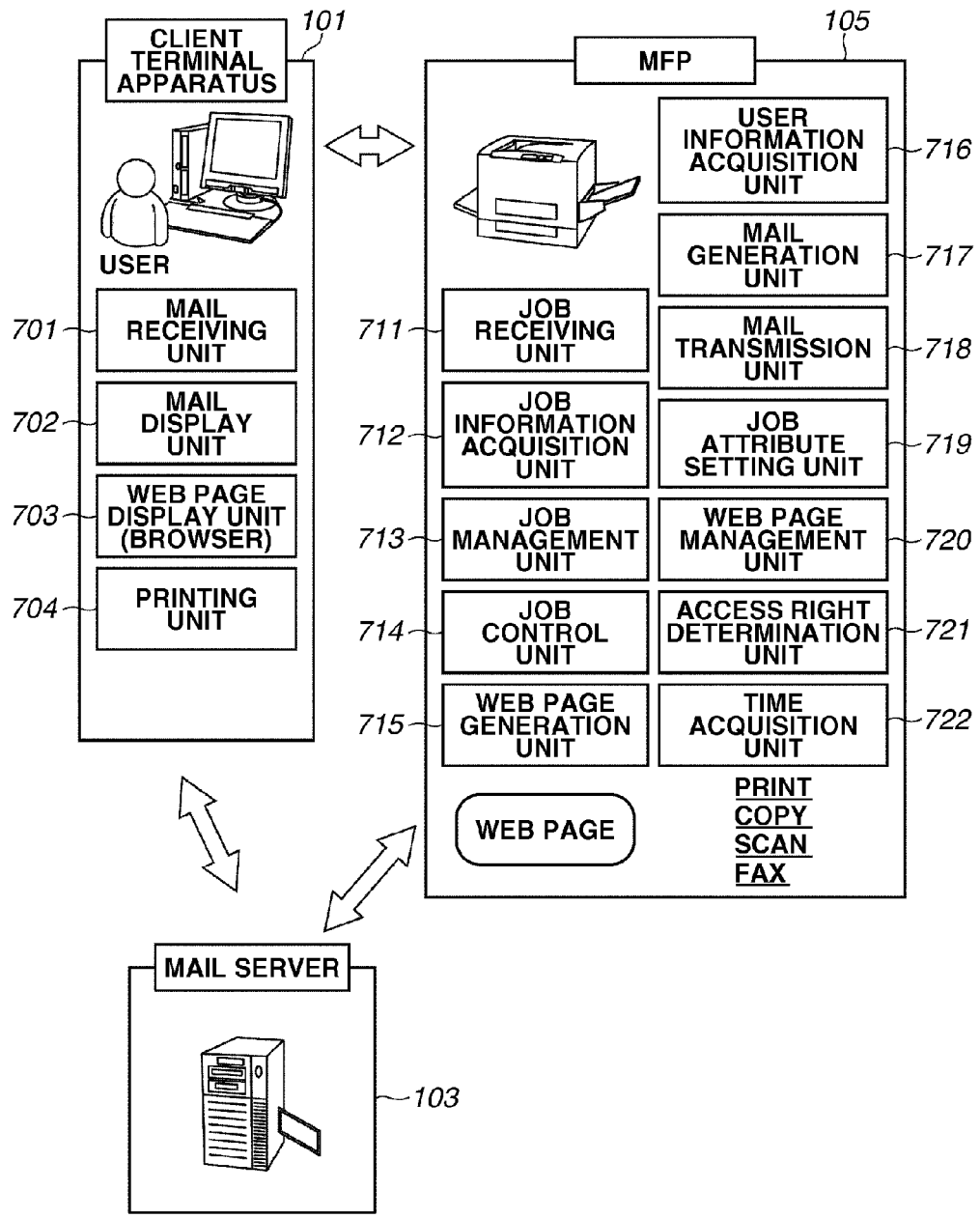
FIG. 7 illustrates an example of a functional configuration of the job management system according to a first exemplary embodiment of the present invention.

An exemplary case where the job management function is implemented on the MFP 105 will now be described in detail below. FIG. 7 illustrates an example of a functional configuration of the job management system according to a first exemplary embodiment of the present invention.

Referring to FIG. 7, an application having an arbitrary print control function, a mailer, and an arbitrary browser program operate on the client terminal apparatuses 101 and 102, which are printing clients. The user issues a print instruction by using an arbitrary application. After receiving the print instruction, a printing unit 704 transmits a print job to a device, such as the MFP 105, via the network 107.

The user verifies an e-mail received by an e-mail receiving unit 701 of the mailer on a UI screen displayed by the e-mail display unit 702 of the mailer on the display 207 of the client terminal apparatuses 101 and 102. An e-mail with content prompts the user to enter charging destination information is displayed by the e-mail display unit 702 on the UI screen.

The user designates a uniform resource locator (URL), which is an example of location information (address information) of a web page described in the e-mail by using the mailer. Alternatively, the user can manually activate a browser 703 and enter the URL. The user operates the keyboard 206 to perform various operations via a screen displayed by the web page display unit (browser) 703. The user can enter information related to user authentication and charging destination information of a job via the screen. The charging destination information entered by the user is transmitted to the MFP 105 via the network 107 as a HyperText Transport Protocol (HTTP) command.

A job receiving unit 711 of the MFP 105 receives a print job instructed by the user. A job information acquisition unit 712 analyzes the print job received by the job receiving unit 711 and acquires job information set to the job.

A job management unit 713 manages the job information acquired by the job information acquisition unit 712 as a job list. The job management unit 713 is the nucleus component of the job management system according to the present exemplary embodiment. The job management unit 713 controls various modules such as a job control unit 714, a web page generation unit 715, and a user information acquisition unit 716.

The job management unit 713 verifies the charging destination information included in the job information managed in the job list. If it is determined that the charging destination information is not appropriate based on a result of the verification, then the job management unit 713 issues an instruction for suspending the print job to the job control unit 714. The job control unit 714 suspends the processing on the print job according to the job suspension instruction.

If it is determined that the charging destination information is not appropriate as a result of the verification of the charging destination information included in the job information managed in the job list, the job management unit 713 issues an instruction for generating a web page for entering charging destination information to the web page generation unit 715. When the web page generation instruction is received, the web page generation unit 715 generates a web page for entering charging destination information.

If the charging destination information is not appropriate as a result of the verification of the charging destination information included in the job information managed in the job list, the job management unit 713 issues an instruction. The instruction issues to the user information acquisition unit 716, for acquiring information such as the e-mail address of the client terminal apparatus that has transmitted the print job (or, the user who is the owner of the job).

When the information acquisition instruction is received, the user information acquisition unit 716 acquires information such as the e-mail address of the client terminal apparatus that has transmitted the print job.

If the charging destination information is not appropriate as a result of the verification of the charging destination information included in the job information managed in the job list, the job management unit 713 issues an instruction, to an e-mail generation unit 717, for generating an e-mail describing the URL of the web page.

When the e-mail generation instruction is received, the e-mail generation unit 717 generates an e-mail by setting the URL of the web page in the text portion of the e-mail and setting the above-described e-mail address as its sending destination. An e-mail transmission unit 718 transmits the generated e-mail via the e-mail server 103.

When the user of the client terminal apparatus accesses the web page, an access right determination unit 721 determines whether the user has the access right and executes user authentication processing where necessary. A time acquisition unit 722 acquires the current date and time required to re-transmit an e-mail to the user and delete a job.

Figure 8:
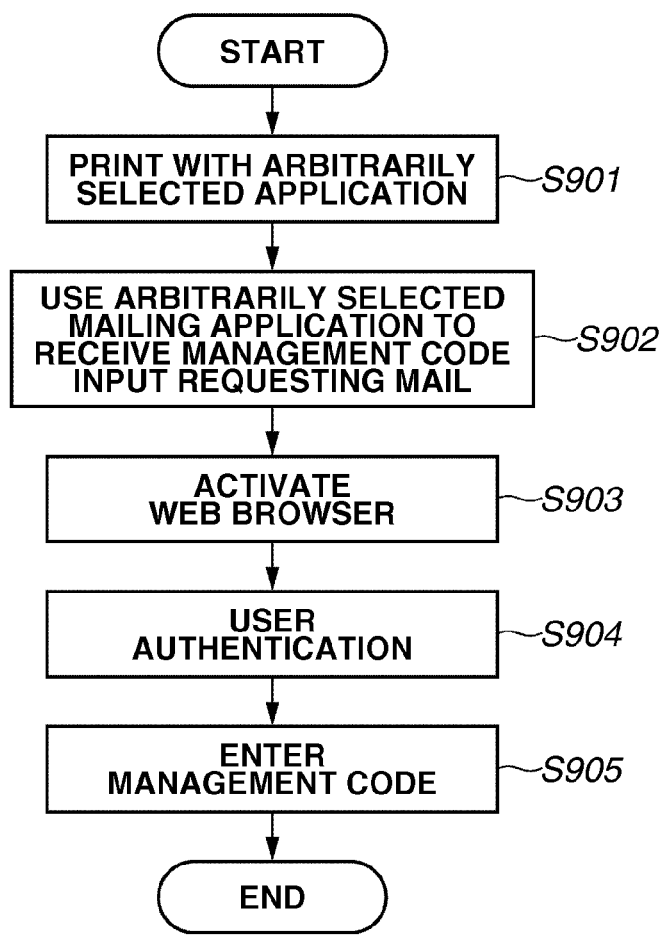
FIG. 8 is a flow chart illustrating an example of processing executed by a client terminal apparatus according to an exemplary embodiment of the present invention.

FIG. 8 is a flow chart illustrating an example of processing executed by the client terminal apparatus according to the present exemplary embodiment. The client terminal apparatuses 101 and 102 execute similar processing. The processing executed by the client terminal apparatus 101 only will be described in detail below. In the present exemplary embodiment, a management code is used as a value indicating charging destination information. Various other values such as a division code indicating a charging destination division can be used as the value indicating the charging destination information.

Referring to FIG. 8, in step S901, the printing unit 704 receives a print instruction issued by the user on an arbitrary application. In step S902, the e-mail receiving unit 701 receives an e-mail that instructs (prompts) the user to enter a management code as illustrated in FIG. 9 or FIG. 10.

FIGS. 9 and 10 each illustrate an example of a notification e-mail that the user receives. Returning to FIG. 8, in step S903, the user requests the activation of the browser 703 by designating the URL included in the text portion of the received mail, which is displayed by the e-mail display unit 702, by operating the keyboard 206. With respect to this operation, if the mailer has a function for automatically activating the browser when the URL included in the text portion of the e-mail is designated, then the user directly designates the URL in the text portion of the e-mail to request the activation of the browser. If the mailer has no such function, the user manually activates the browser and inputs the URL in the text portion of the e-mail by copying and pasting the URL directly into the address bar of the browser.

The browser 703 accesses the web site designated by the URL. When the browser 703 accesses the web site for the first time, a web page management unit 720 displays an authentication screen illustrated in FIG. 11 on the client terminal apparatus 101.

FIG. 11 illustrates an example of an authentication screen according to the present exemplary embodiment. In step S904, when the user enters the user name and a password and presses a login button via the screen illustrated in FIG. 11, the access right determination unit 721 determines whether the user has the access right and executes user authentication according to the entered user name and password.

It is not always necessary to execute the user authentication processing. If the level of security requirements is low, the user authentication processing can be omitted. Furthermore, if it is necessary for the user to enter a domain name in addition to the user name, the MFP 105 generates a screen that allows the user to enter the domain name.

If the user has been successfully authenticated, the web page management unit 720 displays a management code input page illustrated in FIG. 12 or FIG. 13 on the browser of the client terminal apparatus 101. In step S905, the user enters the management code on the management code input page.

FIGS. 12 and 13 each illustrate an example of a management code setting screen according to the present exemplary embodiment.

In FIGS. 12 and 13, the management code has three layers and the user enters a code with respect to each layer. However, the number of layers of the management code and the method of entering the management code are not limited to this. When the user designates the management code and presses an OK button via the screen illustrated in FIGS. 12 and 13, the job management unit 713 of the MFP 105 inputs the management code to the print job.

Figure 14:
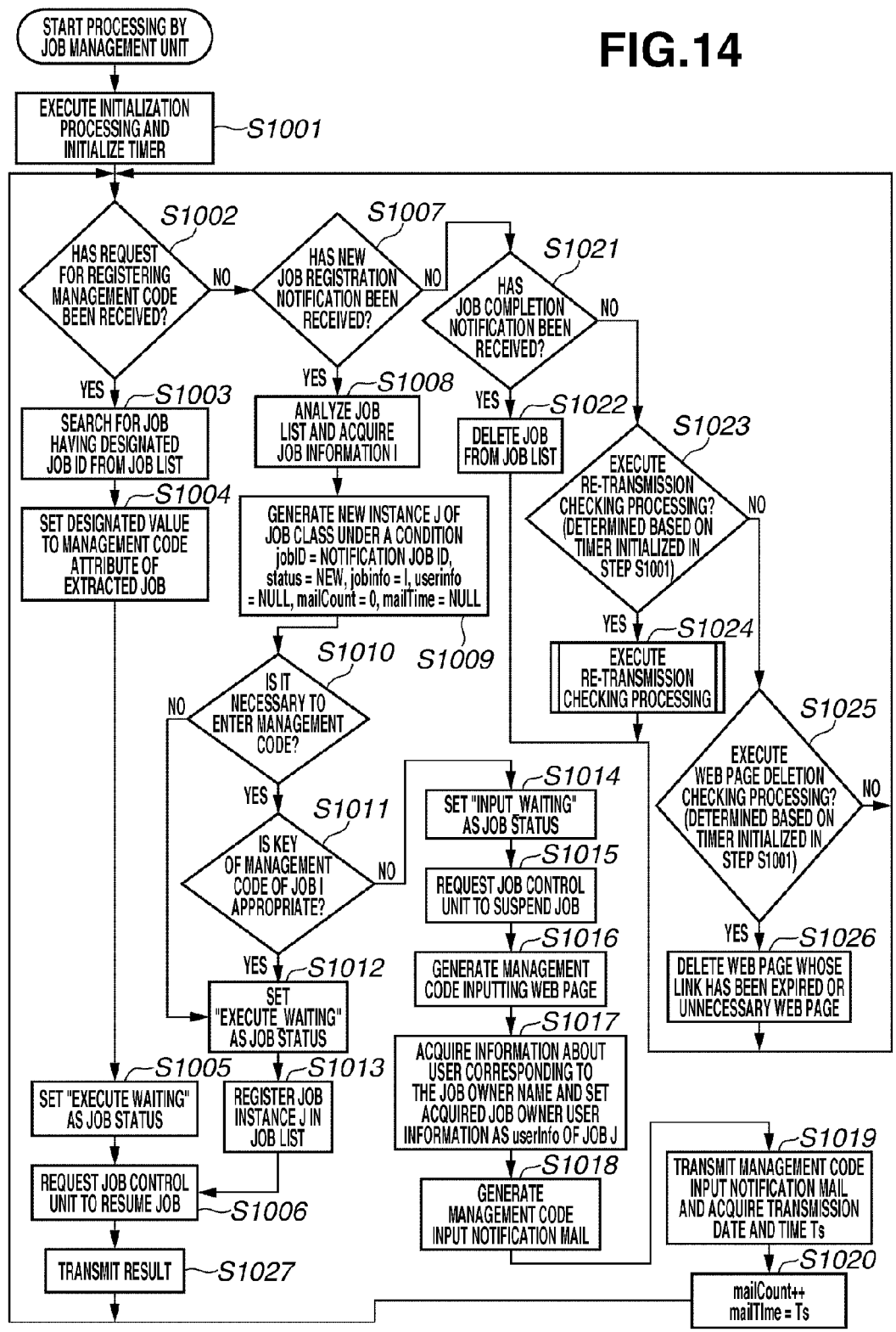
FIG. 14 is a flow chart illustrating an example of processing executed by an MFP according to an exemplary embodiment of the present invention.

Exemplary processing executed by the MFP 105 will be described in detail below with reference to FIG. 14. FIG. 14 is a flow chart illustrating an example of processing executed by the MFP 105 according to the present exemplary embodiment. Before describing the content of the processing executed by the MFP 105, a list and a class of jobs, which are serially processed by the job management unit 713 in order of registration in the job list, will now be described in detail below. An instance of the job class is hereinafter referred to as a "job J" in order to distinguish between a job in a large sense and the job class.

FIG. 15 illustrates an example of a member of an instance of a job class (job J) according to the present exemplary embodiment. A job ID member is utilized for uniquely identifying the job J with the job management unit 713 and the job control unit 714. The initial value for the job ID member is 1. Every time a job class instance is generated, the job ID member is incremented by one.

In the present exemplary embodiment, the job control unit 714 identifies a job by referring to the job ID. However, the job management unit 713 can provide the value for the job ID. The job management unit 713 separately adds an ID used by the job control unit 714 to the member of the job J. The job control unit 714 can use the ID provided by the job management unit 713 when a request for controlling a job is issued to the job control unit 714.

A status member is used to manage the status of processing of the job J. More specifically, the status member is used to manage three different kinds of statuses, which include "NEW" (newly generated), "INPUT_WAITING" (waiting for the user to enter a management code), and "EXECUTE_WAITING" (waiting for execution).

A mailCount member indicates the number of e-mails notified to the client user (job owner). The initial value of the mailCount member is "0". The mailCount member is incremented by 1 every time the e-mail is transmitted to the user.

A mailTime member is used to manage the last date and time of notification of the e-mail to the client user. In the present exemplary embodiment, the latest e-mail transmission date and time is utilized in re-transmission checking processing.

A jobInfo member is information set to a job. The jobInfo member has lower-order members. A value set to each lower-order member according to a result of analysis of a job by the job information acquisition unit 712. The value is utilized in displaying a job list as information that allows the user to identify a job.

A lower-order member of the jobInfo member will be described in detail below. A kind member indicates the kind or the type of job. The kind member is used to manage the job type such as a print job, a copy job, a scan job, a FAX transmission job, or a FAX receiving job.

An ownerName member indicates the name of the job owner. The ownerName member is used to manage the name of the user who has executed the job. The value of the ownerName member is used in searching for user information as a key. A submittedTime member indicates the date and time of receiving a job. The submittedTime member is used in job expiration checking processing. In the present exemplary embodiment, the job receiving date and time is used. However, the job generation date and time can be used instead.

A documentName member manages a document name. A deviceName manages the device name of the printer or the MFP that has executed the job. A billingCode member indicates an attribute of a management code. The billingCode member is an attribute indicating the charging destination information. A userInfo member manages user information. When the e-mail is transmitted to the user for the first time, the e-mail generation unit 717 acquires the user information from the user information acquisition unit 716 by using jobInfo→ownerName as a key.

The lower-order member "userInfo" includes at least a "mailAddress" member, which is used in generating an e-mail. If a name other than the ownerName member is used and displayed in generating the e-mail and on the display on the browser, the e-mail generation unit 717 acquires a necessary name. It is also useful if the e-mail generation unit 717 acquires a full name of the user as a "userFullName" member and the acquired full name of the user is used.

Processing executed according to the flow chart of FIG. 14 will now be described in detail below. Referring to FIG. 14, in step S1001, the job management unit 713 executes the initialization processing. The initialization processing includes e-mail re-transmission processing, which is periodically executed, and the initialization of a timer, which is executed to perform web page deletion processing.

The job management unit 713 acquires a maximum number of times of e-mail transmission Cmax and a maximum retransmission waiting time Ts. The maximum number of times of e-mail transmission Cmax and the maximum retransmission waiting time Ts will be described in detail later below.

The job management unit 713 acquires a list of management codes necessary for determining whether the value of the management code is appropriate and generating a management code input web page during the initialization processing where necessary. The initialization processing can be executed by the job management unit 713 during booting of the device or by the CPU 300 when the CPU 300 calls the job management unit 713.

In step S1002, the job management unit 713 determines whether the user has issued a request for registering a management code by operating the management code input web page. The management code registration request includes a list of IDs of jobs to be registered and an attribute value thereof as IN parameters (input parameters), which are associated with the request.

If the user has issued a management code registration request (YES in step S1002), then the processing advances to step S1003. If the user has not issued a management code registration request (NO in step S1002), the processing advances to step S1007.

In step S1003, the job management unit 713 searches for all jobs included in the job ID list designated in the management code registration request from the job list that the job management unit 713 manages. In step S1004, after searching for all jobs with the job management unit 713, a job attribute setting unit 719 (FIG. 7) sets the attribute value designated in the management code registration request to the management code attribute of the extracted job.

In step S1005, the job management unit 713 changes the status member of the job, to which the management code has been set in step S1004, to "EXECUTE_WAITING", which indicates that the job has been waiting for its execution. In step S1006, the job management unit 713 issues a request for resuming the job to the job control unit 714.

In step S1027, if the attribute has been set to each job ID, the job attribute setting unit 719 transmits a result code indicating that the attribute has been set to the job management unit 713. If the attribute has not been successfully set to each job ID, the job attribute setting unit 719 transmits an error code to the job management unit 713. The processing returns to step S1002.

In step S1007, the job management unit 713 determines whether a new job registration notification has been received from the job control unit 714. At least a job ID of the job that has been newly registered by the job control unit 714 is included in the new job registration notification.

If a new job registration notification has been received from the job control unit 714 (YES in step S1007), then the processing advances to step S1008. If a new job registration notification has not been received from the job control unit 714 (NO in step S1007), then the processing advances to step S1021.

In step S1008, the job management unit 713 analyzes the newly registered job by utilizing the job information acquisition unit 712 to acquire job information I. In step S1009, the job management unit 713 generates a job instance J. In generating the job instance J, the job management unit 713 initializes each job member as follows:
jobID=job ID included in the new registration notification
status=NEW
jobInfo=I
userInfo=NULL
mailCount=0
mailTime=NULL In step S1010, the job management unit 713 determines whether it is necessary to enter a management code to the job J. In executing the determination in step S1010, various types of methods can be used. More specifically, the determination can be executed on each job, each user, each device, or uniquely to the entire system.

In executing the determination on each job, the job management unit 713 can execute the determination based on the document name or the job type. In executing the determination on each user, the job management unit 713 can acquire a parameter value indicating whether it is necessary to enter the management code from the user information acquisition unit 716 and refer to the parameter value and can execute the determination based on the parameter value.

In executing the determination on each device, the job management unit 713 can acquire a value that has been set to the device as a device initialization attribute from a system administrator or a system server and refer to the value and can execute the determination based on the acquired value. In executing the determination uniquely to the entire system, the job management unit 713 can acquire a value that has been set to the system as a device initialization attribute from a system administrator or a system server and refer to the value and can execute the determination based on the acquired value.

If it is necessary to enter a management code to the job J (YES in step S1010), then the processing advances to step S1011. If it is not necessary to enter a management code to the job J (NO in step S1010), then the processing advances to step S1012.

In step S1011, the job management unit 713 determines whether the attribute value of the billingCode member in the jobInfo member is appropriate. If the attribute value of the billingCode member in the jobInfo member is appropriate (YES in step S1011), then the processing advances to step S1012. If the attribute value of the billingCode member in the jobInfo member is not appropriate (NO in step S1011), then the processing advances to step S1014.

Two different methods can be used as the method for executing the determination in step S1011. The job management unit 713 can execute the determination in step S1011 by determining whether an attribute value has been input. Alternatively, the job management unit 713 can execute the determination in step S1011 by determining whether the input attribute value is appropriate.

In a system that determines an input value to be appropriate, it is useful to use a method for simply determining that the attribute value is appropriate if an attribute value is input.

A method for determining whether the attribute value of the management code itself is valid (determining whether the input attribute value is valid to the user) can be used. When this method is used, the job management unit 713 acquires a list of management codes that the user can use and refers to the value of the management code. If the value of the input management code is valid, the job management unit 713 determines that the attribute value is appropriate.

In step S1012, the job management unit 713 sets a parameter value "EXECUTE_WAITING" as the status of the job. In step S1013, the job management unit 713 registers the job J in the job list. After the processing in step S1013, the job management unit 713 advances to step S1006.

In step S1014, the job management unit 713 sets "INPUT_WAITING" as the status of the job. In step S1015, the job management unit 713 issues a request for suspending the job to the job control unit 714.

In step S1016, the web page generation unit 715 generates a management code inputting web page illustrated in FIG. 12 based on the job information about the job J according to the request from the job management unit 713 (screen generation processing).

In the management code inputting web page illustrated in FIG. 12, the document name, the job owner name, the printer name (the device name), and the job receiving date and time, which have been acquired from the job information, are included. In the present embodiment, as illustrated in FIG. 12, the management code is designated by three values, namely, Client, Matter, and Submatter.

By designating the management code in the above-described manner, the charging destination (Client), the purpose of the job (Matter), and other additional information (Submatter) can be set as the management code. It is not necessary that all of the three management codes are input. If the values Client and Matter only are input, the values can be used as appropriate management codes. The input of the code can be executed by static text string input control.

In displaying the value that the user can designate only, the job management unit 713 stores a list of candidates of each value. It is necessary that the web page generation unit 715 generate a web page that displays the value that the user can designate only based on the information included in the list of candidate of each value.

In step S1017, the user information acquisition unit 716 acquires the user information about the job owner described in the jobInfo member of the job J and the job management unit 713 sets the user information about the job owner in the userInfo member.

It is necessary that the user information include at least a mailAddress member, which is necessary for generating an e-mail. In step S1018, the e-mail generation unit 717 generates a management code input notification e-mail illustrated in FIG. 9, which is addressed to the e-mail address and describes the URL of the web page generated in step S1016 in its text portion.

In step S1019, the e-mail transmission unit 718 transmits the management code input notification e-mail to the e-mail server 103. The e-mail describing the URL of the web page is transmitted as a notification to the client terminal apparatus to prompt the user to enter the charging destination information. In step S1019, the time acquisition unit 722 acquires transmission date and time Ts.

In step S1020, the job management unit 713 increments the mailCount member of the job and sets the date and time Ts as the mailTime member. Then, the processing returns to step S1002.

In step S1021, the job management unit 713 determines whether a job completion notification has been received from the job control unit 714.

If a job completion notification has been received from the job control unit 714 (YES in step S1021), then the processing advances to step S1022. If no job completion notification has been received from the job control unit 714 (NO in step S1021), then the processing advances to step S1023.

In step S1022, the job management unit 713 deletes the job from the job list. In step S1023, the job management unit 713 determines whether to execute re-transmission checking processing according to the timer initialized in step S1001.

If re-transmission checking processing is to be executed (YES in step S1023), then the processing advances to step S1024. If re-transmission checking processing is not to be executed (NO in step S1023), then the processing advances to step S1025.

In step S1024, the job management unit 713 executes the e-mail re-transmission checking processing. The e-mail re-transmission checking processing will be described in detail below with reference to FIG. 16. In step S1025, the job management unit 713 determines whether to execute web page deletion checking processing according to the timer initialized in step S1001.

If it is determined that web page deletion checking processing is to be executed (YES in step S1025), then the processing advances to step S1026. If it is determined that web page deletion checking processing is not to be executed (NO in step S1025), then the processing returns to step S1002.

In step S1026, the job management unit 713 issues a request for deleting a web page whose effective period has expired or an unnecessary web page to the web page management unit 720.

The e-mail re-transmission checking processing will be described in detail below with reference to FIG. 16. FIG. 16 is a flow chart illustrating an example of e-mail re-transmission checking processing according to the present exemplary embodiment.

Referring to FIG. 16, in step S1101, the job management unit 713 acquires the number of jobs S in the job list that the job management unit 713 manages, and initializes a processing index k with "0". In step S1102, the job management unit 713 acquires the present time T now via the time acquisition unit 722.

In step S1103, the job management unit 713 acquires each value, such as a job ID of a job Jk (the k-th element in the job list) "Idk", a status of the job Jk "Sk", the mailCount member of the job Jk "Ck", and the ownerName member included in the jobInfo member of the job Jk "Uk".

In step S1104, the job management unit 713 determines whether the value Sk indicates "INPUT_WAITING". If the value Sk indicates "INPUT_WAITING" (YES in step S1104), then the processing advances to step S1105. If the value Sk does not indicate "INPUT_WAITING" (NO in step S1104), then the processing advances to step S1109.

In step S1105, the job management unit 713 determines whether the value Ck is smaller than the maximum number of times of e-mail transmission Cmax.

The determination in step S1105 is executed to automatically delete the job to which the user has not executed an input operation for a long period of time. However, if such a job is not to be automatically deleted, the MFP 105 can set a specific value such as a negative value to the value Cmax. In the present exemplary embodiment, the job automatic deletion function is controlled according to the maximum number of times of e-mail transmission Cmax.

Instead of employing the above-described control, the automatic deletion of a job can be executed when a maximum wait time for entering a management code has elapsed since the date and time of generation of a job.

If the value Ck is smaller than the maximum number of times of e-mail transmission Cmax (YES in step S1105), then the processing advances to step S1106. If the value Ck is not smaller than the maximum number of times of e-mail transmission Cmax (NO in step S1105), then the processing advances to step S1117.

In step S1106, the job management unit 713 calculates input waiting time T. More specifically, the job management unit 713 calculates the input waiting time T by subtracting Tk from Tnow. In step S1107, the job management unit 713 determines whether the input waiting time T is greater than the maximum retransmission waiting time Ts.

If the input waiting time T is greater than the maximum retransmission waiting time Ts (YES in step S1107), then the processing advances to step S1108. If the input waiting time T is equal to or smaller than the maximum retransmission waiting time Ts (NO in step S1107), then the processing advances to step S1109.

In step S1108, the job management unit 713 registers Uk and Idk in a list of retransmitting users to execute the retransmission of the e-mail.

In step S1109, the job management unit 713 increments k by 1 and then determines whether k is equal to the number of jobs S (whether all the jobs in the job list have been completely processed). If it is determined that k is equal to the number of jobs S (YES in step S1109), then the job management unit 713 advances to step S1110. If it is determined that k is not equal to the number of jobs S (NO in step S1109), then the job management unit 713 returns to step S1103.

In step S1110, the job management unit 713 acquires the number of elements M, which indicates the number of users in the retransmitting user list, and initializes a processing index p with "0." In step S1111, the job management unit 713 acquires the userInfo member of a job of a user Up, who is the p-th element in the retransmitting user list and has executed a job to which no management code has been set.

In step S1112, the web page generation unit 715 generates a management code input waiting job list web page according to the request from the job management unit 713.

FIG. 17 illustrates an example of a management code input waiting job list screen according to the present exemplary embodiment. The screen illustrated in FIG. 17 displays a list of jobs that have been waiting for a user's management code to be input.

Returning to FIG. 16, in step S1113, the e-mail generation unit 717 generates a management code input notification mail addressed to the mailAddress member in the userInfo member acquired in step S1111 and describing the URL of the web page in its text portion. In step S1114, the e-mail transmission unit 718 transmits the e-mail to the e-mail server 103 and acquires the transmission date and time Ts.

In step S1115, the job management unit 713 increments the mailCount member of the job whose userInfo member has been acquired in step S1111 and sets the time Ts as the mailTime member.

It is also useful if the job management unit 713 executes the same processing on all the jobs displayed as a list in the screen illustrated in FIG. 17.

In step S1116, the job management unit 713 increments p by 1 and determines whether p is equal to M. If it is determined that p is equal to M (YES in step S1116), then the e-mail re-transmission checking processing illustrated in FIG. 16 ends. If it is determined that p is not equal to M (NO in step S1116), then the processing returns to step S1111.

In step S1117, the job management unit 713 issues a request for deleting the job Jk to the job control unit 714. In step S1118, the job control unit 714 deletes the job Jk from the job list.

Figure 18:
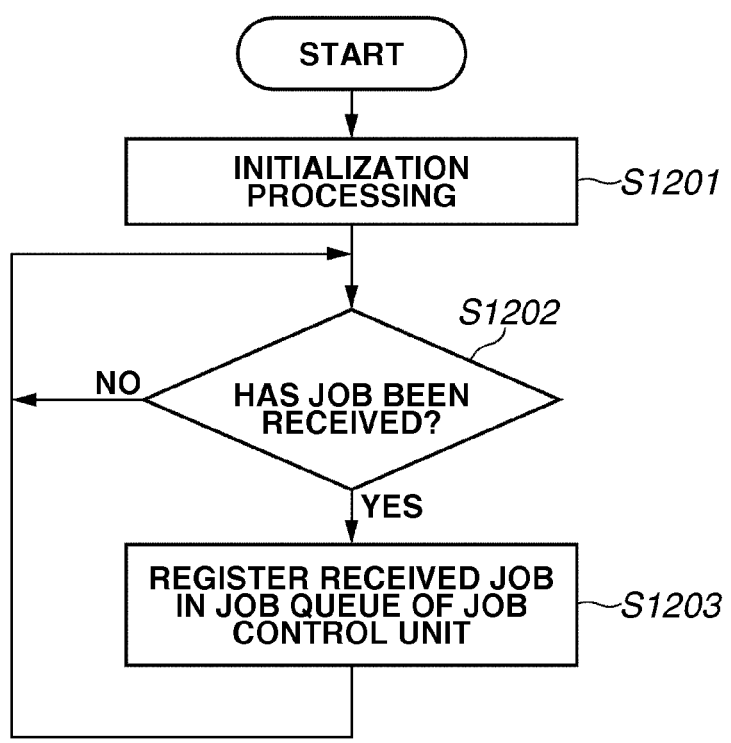
FIG. 18 is a flow chart illustrating an example of job receiving processing according to an exemplary embodiment of the present invention.

Exemplary job receiving processing will be described in detail below with reference to FIG. 18. FIG. 18 is a flow chart illustrating an example of job receiving processing according to the present exemplary embodiment.

Referring to FIG. 18, in step S1201, the job receiving unit 711 executes necessary initialization processing. The initialization processing can be executed by the job receiving unit 711 at the time of booting the device. Alternatively, the initialization processing can be executed by the CPU 300 when the CPU 300 calls the job receiving unit 711.

In step S1202, the job receiving unit 711 determines whether a job has been received. If it is determined that a job has been received (YES in step S1202), then the processing advances to step S1203. If it is determined that no job has been received (NO in step S1202), then the job receiving unit 711 repeats the processing in step S1202.

In step S1203, the job receiving unit 711 registers the received job in a job queue, which is a predetermined job storage area for the job control unit 714.

Figure 19:
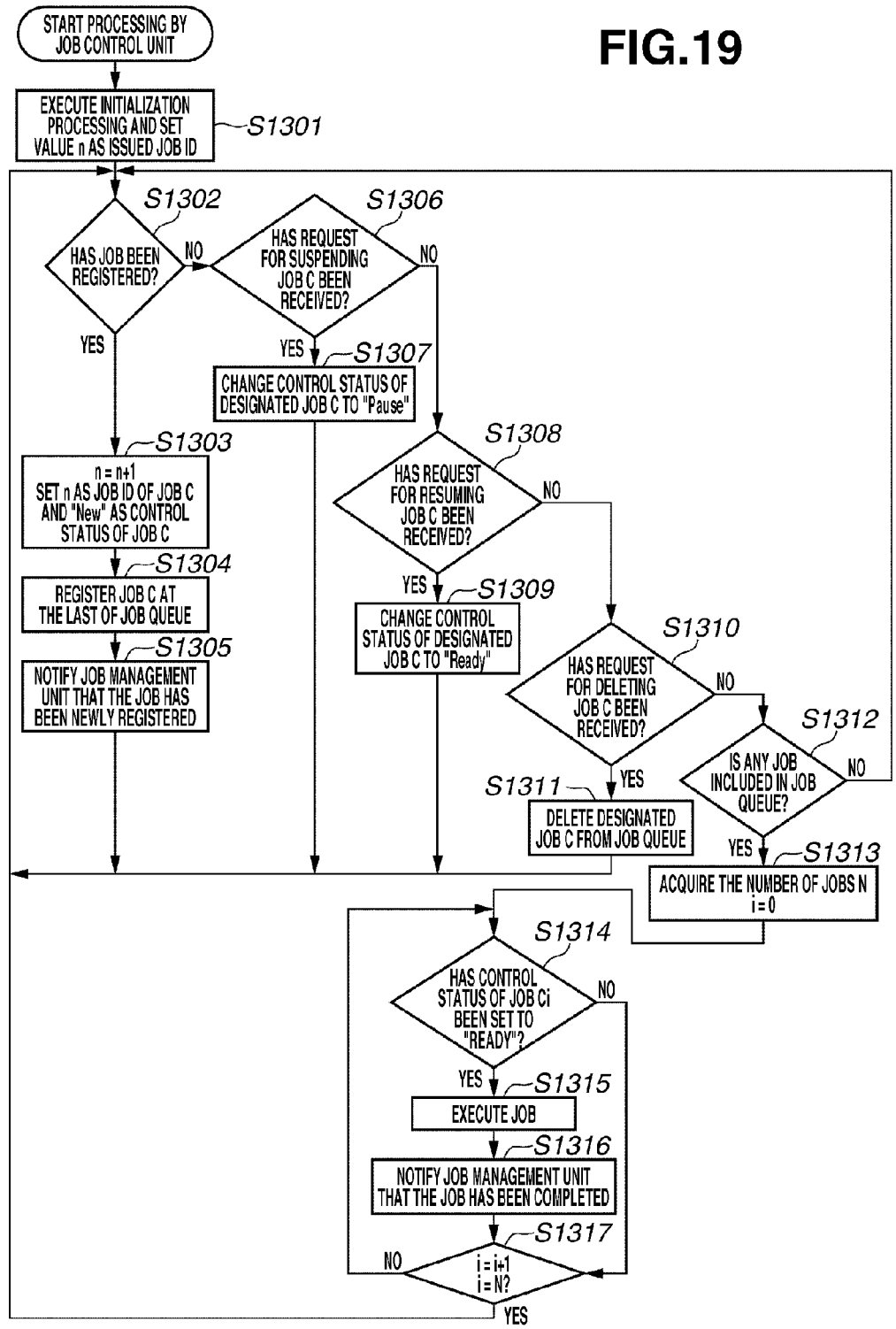
FIG. 19 is a flow chart illustrating an example of job control processing according to an exemplary embodiment of the present invention.

Exemplary job control processing will now be described in detail below with reference to FIG. 19. FIG. 19 is a flow chart illustrating an example of job control processing according to the present exemplary embodiment.

Referring to FIG. 19, the job control unit 714 independently manages the job queue. The job control unit 714 manages a job control status (hereinafter simply referred to as a "control status") for each job registered in the job queue.

In the following description, the job managed by the job control unit 714 is referred to as a "job C" to distinguish the job from the job J managed by the job management unit 713. The job C includes at least a member of the control status, such as jobID.

The jobID member is handled in common with the above-described job management unit 713. The job control status includes three statuses, namely, "New" (newly registered), "Ready" (waiting for its execution), and "Pause" (being suspended). The job control unit 714 executes the job C registered in the job queue whose job control status is "Ready" only.

Referring to FIG. 19, in step S1301, the job control unit 714 executes necessary initialization processing. The job control unit 714 at the time of booting the device can execute the initialization processing. Alternatively, the CPU 300 can execute the initialization processing when the CPU 300 calls the job control unit 714.

In step S1302, the job control unit 714 determines whether a job has been registered from the job receiving unit 711. If it is determined that a job has been registered from the job receiving unit 711 (YES in step S1302), then the processing advances to step S1303. If it is determined that no job has been registered from the job receiving unit 711 (NO in step S1302), then the processing advances to step S1306.

In step S1303, the job control unit 714 increments n by 1, sets the value n to the jobID member of the new job C, and sets the parameter value "New" as the control status. In step S1304, the job control unit 714 registers the job C as the last job in the job queue. In step S1305, the job control unit 714 notifies the job management unit 713 that the job has been newly registered. Then, the processing returns to step S1302.

When the notification in step S1305 is received, the job management unit 713 determines that a new job registration notification has been received (YES in step S1007 of FIG. 14).

In step S1306, the job control unit 714 determines whether a request for suspending the job C has been received. The job management unit 713 in step S1015 in FIG. 14 issues the job C suspending request.

If a request for suspending the job C has been received (YES in step S1306), then the processing advances to step S1307. If a request for suspending the job C has not been received (NO in step S1306), then the processing advances to step S1308.

In step S1307, the job control unit 714 searches the job queue for a designated job C and changes the control status to "Pause". Then, the processing returns to step S1302.

In step S1308, the job control unit 714 determines whether a request for resuming the job C has been received. The job management unit 713 in step S1006 in FIG. 14 issues the job C resuming request.

If a request for resuming the job C has been received (YES in step S1308), then the processing advances to step S1309. If a request for resuming the job C has not been received (NO in step S1308), then the processing advances to step S1310.

In step S1309, the job control unit 714 searches the job queue for the designated job C and changes the control status to "Ready." In step S1310, the job control unit 714 determines whether a request for deleting the job C has been received. The job deleting request is issued by the job management unit 713 in step S1117 in FIG. 16.

If a request for deleting the job C has been received (YES in step S1310), then the job control unit 714 advances to step S1311. If a request for deleting the job C has not been received (NO in step S1310), then the job control unit 714 advances to step S1312.

In step S1311, the job control unit 714 searches the job queue for the designated job C and deletes the designated job C. Then, the processing returns to step S1302.

In step S1312, the job control unit 714 determines whether the job queue includes a job. If it is determined that the job queue includes a job (YES in step S1312), then the processing advances to step S1313. If the job queue does not include a job (NO in step S1312), then the processing returns to step S1302.

In step S1313, the job control unit 714 acquires the number "N" of jobs that have been registered in the job queue and initializes a processing index i with "0." In step S1314, the job control unit 714 determines whether the control status of a job Ci, which is the i-th element in the job queue, is "Ready." If the control status of the job Ci is "Ready" (YES in step S1314), then the processing advances to step S1315. If the control status of the job Ci is not "Ready" (NO in step S1314), then the processing advances to step S1317.

In step S1315, the job control unit 714 executes processing, such as print processing, on the job. In step S1316, after completing the job processing, the job control unit 714 transmits a job completion notification to the job management unit 713.

After receiving the job completion notification, the job management unit 713 executes the processing in steps S1021 and S1022 (FIG. 14).

In step S1317, the job control unit 714 increments i by 1 and then determines whether i is equal to N (whether all of the jobs in the job queue have been processed). If it is determined that i is equal to N (YES in step S1317), the processing returns to step S1302. If it is determined that i is not equal to N (NO in step S1317), the processing returns to step S1314. In the present exemplary embodiment, the jobs in the job queue whose control status is "Ready" are serially executed in order of registration (in order of receipt by the printer).

Figure 20:
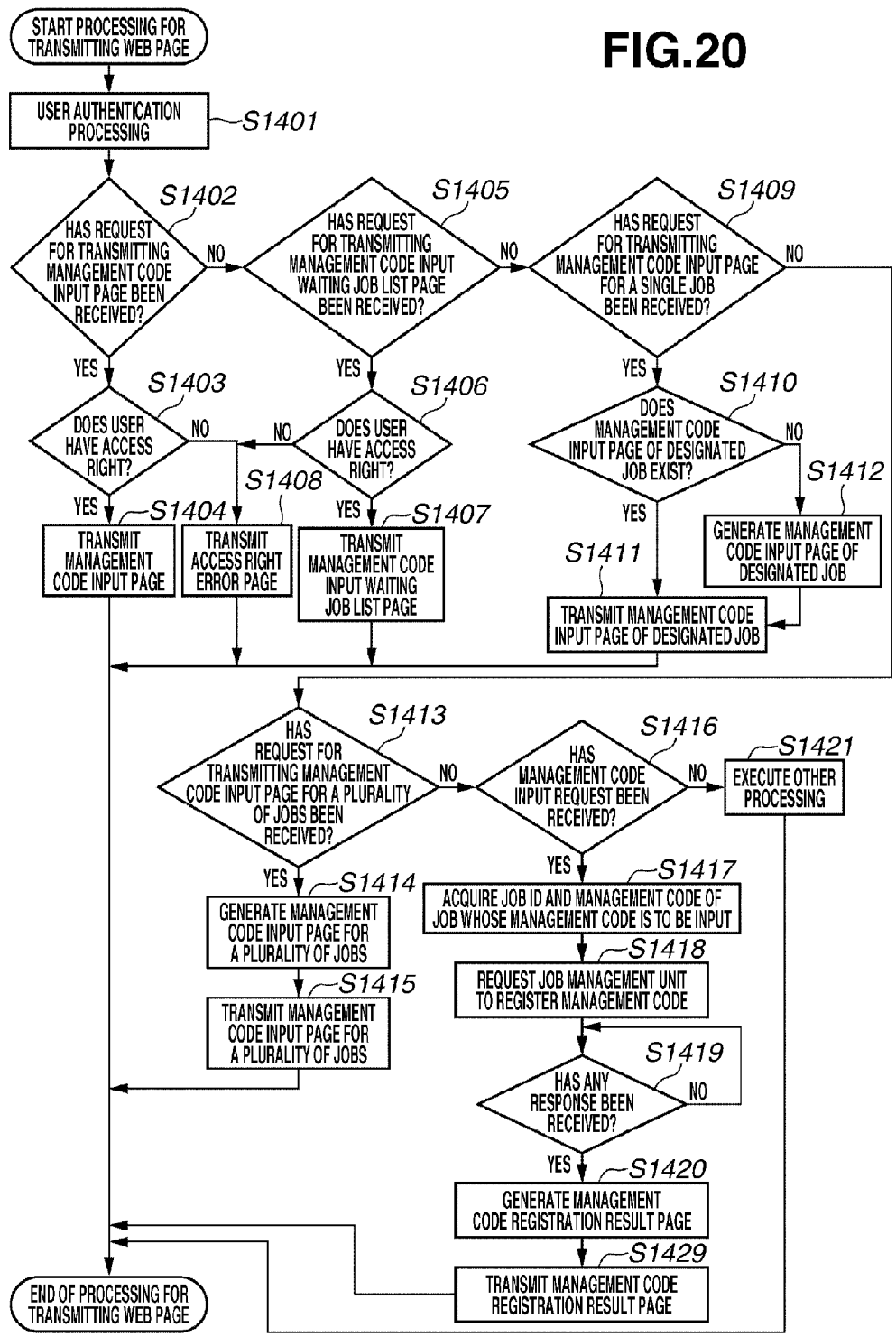
FIG. 20 is a flow chart illustrating an example of web page transmission processing according to an exemplary embodiment of the present invention.

Exemplary web page transmission processing will now be described in detail below with reference to FIG. 20. FIG. 20 is a flow chart illustrating an example of web page transmission processing according to the present exemplary embodiment.

Referring to FIG. 20, when the user accesses the web page via the URL set in the e-mail illustrated in FIG. 9 or FIG. 10 via the browser 703, the web page illustrated in FIG. 11 is displayed on the browser 703. In step S1401, the user performs an operation for user authentication processing via the web page. If the user has been authenticated, then the web page management unit 720 executes processing in step S1402. If the user has not been authenticated, the web page generation unit 715 displays an authentication screen on the browser 703 and executes the user authentication with the access right determination unit 721 according to the entered authentication information.

When the authentication processing is completed, the web page generation unit 715 determines whether a request for transmitting a management code input page having a predetermined URL has been received.

The transmission request is transmitted to the web page generation unit 715 when the web page management unit 720 has detected that the user has accessed the web page generated by the web page generation unit 715 in step S1016 (FIG. 14).

If a request for transmitting a management code input page having a predetermined URL has been received (YES in step S1402), then the processing advances to step S1403. If a request for transmitting a management code input page having a predetermined URL has not been received (NO in step S1402), then the processing advances to step S1405.

In step S1403, the web page generation unit 715 identifies the user according to the entered authentication information and determines whether the user can access the above-described URL with the access right determination unit 721. If the user has the access right (YES in step S1403), then the processing advances to step S1404. If the user does not have the access right (NO in step S1403), then the processing advances to step S1408.

In step S1404, the web page generation unit 715 transmits the designated URL (information about a management code input page for a specific job). In step S1405, the web page generation unit 715 determines whether a request for transmitting a management code input waiting job list page has been received. The transmission request is issued to the web page generation unit 715 if the web page management unit 720 has detected that the user has accessed the web page generated by the web page generation unit 715 in step S1112 (FIG. 16).

If a request for transmitting a management code input waiting job list page has been received (YES in step S1405), then the processing advances to step S1406. If a request for transmitting a management code input waiting job list page has not been received (NO in step S1405), then the processing advances to step S1409.

In step S1406, the web page generation unit 715 identifies the user according to the authentication information and determines whether the user can access the URL of the management code input waiting job list page with the access right determination unit 721.

If the user has the access right according to a result of the determination by the access right determination unit 721 (YES in step S1406), then the web page generation unit 715 advances to step S1407. If it is determined that the user does not have the access right (NO in step S1406), then the web page generation unit 715 advances to step S1408.

In step S1407, the web page generation unit 715 transmits the designated URL (information about the management code input waiting job list page). In step S1408, the web page generation unit 715 transmits error page information about the page to which the user does not have the access right.

In step S1409, the web page generation unit 715 determines whether a request for transmitting a single job management code inputting page has been received. The transmission request is transmitted to the web page generation unit 715 when the web page management unit 720 has detected that the user has selected one job via the web page that the web page generation unit 715 has generated in step S1112 in FIG. 16.

As described above, FIG. 17 illustrates an example of the management code input waiting job list screen. When the user marks a check box to the left of the document name of the document whose management code is to be entered and presses a management code input button, the request for transmitting a single job management code inputting page is issued. Alternatively, when the user presses a button corresponding to the status of a desired document "waiting for management code to be entered," the above-described request is issued.

If a request for transmitting a single job management code inputting page has been received (YES in step S1409), then the processing advances to step S1410. If no request for transmitting a single job management code inputting page has been received (NO in step S1409), then the processing advances to step S1413.

In step S1410, the web page generation unit 715 determines whether a management code inputting page for the designated job exists. If a management code inputting page for the designated job exists (YES in step S1410), then the processing advances to step S1411. If a management code inputting page for the designated job does not exist (NO in step S1410), then the processing advances to step S1412.

In step S1412, the web page generation unit 715 generates a management code inputting page of the designated job. In step S1411, the web page generation unit 715 transmits information about the management code inputting page of the designated job. In step S1413, the web page generation unit 715 determines whether a request for transmitting a management code inputting page for a plurality of jobs has been received.

The transmission request is transmitted to the web page generation unit 715 when the web page management unit 720 has detected that the user has selected a plurality of jobs via the web page generated by the web page generation unit 715 in step S1112 (FIG. 16). When the user marks a plurality of check boxes to the left of the document name of the document whose management code is to be entered and presses a management code input button, the request for transmitting a management code inputting page for a plurality of jobs is issued.

If a request for transmitting a management code inputting page for a plurality of jobs has been received (YES in step S1413), then the processing advances to step S1414. If a request for transmitting a management code inputting page for a plurality of jobs has not been received (NO in step S1413), then the processing advances to step S1416.

In step S1414, the web page generation unit 715 generates a plurality of jobs-management code setting screen (a management code input screen for a plurality of jobs) illustrated in FIG. 13. In step S1415, the web page generation unit 715 transmits information about the generated management code input page for a plurality of jobs.

In step S1416, the web page generation unit 715 determines whether a request for entering the management code has been received. The input request is transmitted to the web page generation unit 715 when the web page management unit 720 has detected that the user has entered the management code via the web page generated by the web page generation unit 715 in step S1016 (FIG. 14).

If a request for entering the management code has been received (YES in step S1416), then the processing advances to step S1417. If a request for entering the management code has not been received (NO in step S1416), then the processing advances to step S1421.

In step S1421, the web page generation unit 715 executes appropriate processing. The processing executed in step S1421 will be described in detail below as another exemplary embodiment with reference to FIG. 23.

In step S1417, the web page generation unit 715 analyzes the HTTP command related to the request for entering the management code and acquires the job ID of the job whose management code is to be entered and the management code to be set. When a single job is to be executed, only one job ID of the job whose management code is to be entered is acquired. When a plurality of jobs is to be executed, the number of job IDs of the jobs whose management code is to be entered is equivalent to the number of jobs.

In step S1418, the web page generation unit 715 designates the job ID or a job ID list and the management code and issues a request for registering the management code to the job management unit 713. The job management unit 713 determines whether the request has been issued in step S1002 (FIG. 14) and executes the requested processing in step S1003 (FIG. 14) and subsequent steps. In step S1027 (FIG. 14), the job management unit 713 transmits a result of the processing.

In step S1419 (FIG. 20), the web page generation unit 715 waits until the result is received. In step S1420, when the result is received, the web page generation unit 715 generates a page indicating the result of registering the management code according to the received result.

In step S1429, the web page generation unit 715 transmits information about the generated page indicating the management code registration result to the client terminal apparatus 101.

A second exemplary embodiment of the present invention will now be described in detail below. In the first exemplary embodiment, the client terminal apparatus 101 or 102 transmits the job to the device (the MFP 105 or the printer 106). The primary program operates on the device. However, according to the type of the device, the program cannot be installed on the device due to the matters related to the resource, such as the limited capacity of the storage area.

In the present exemplary embodiment, the program implementing the functions of the first exemplary embodiment is executed on the print server 104. In the following description, only the configuration of the present exemplary embodiment that is different from that of the first exemplary embodiment will be described in detail. Accordingly, units and components that are similar to those of the first exemplary embodiment will not be described in detail below.

Figure 21:
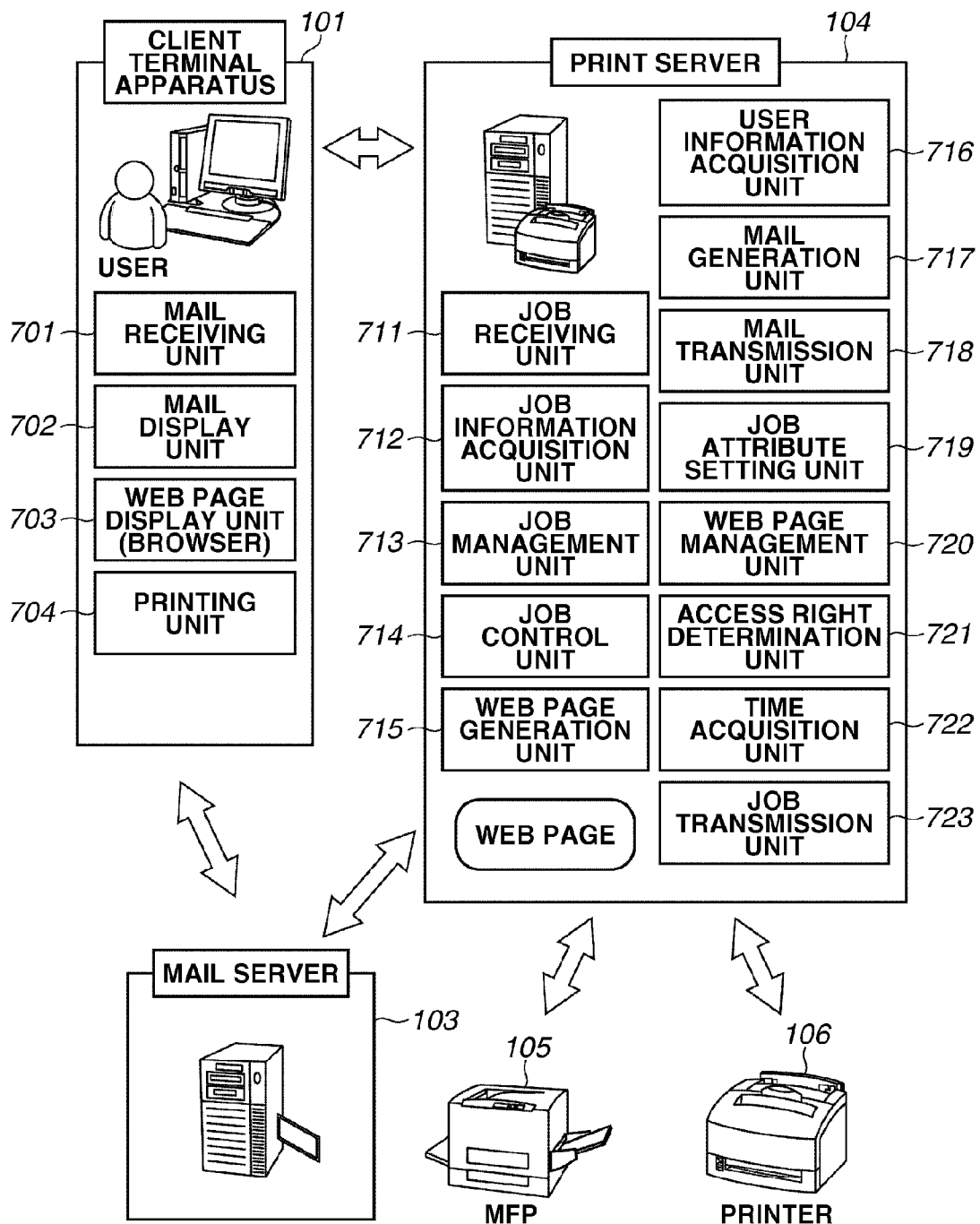
FIG. 21 illustrates an example of a functional configuration of a job management system according to a second exemplary embodiment of the present invention.

FIG. 21 illustrates an example of a functional configuration of a job management system according to the second exemplary embodiment of the present invention. Referring to FIG. 21, the print server 104 includes the functions of the job receiving unit 711, the job information acquisition unit 712, the job management unit 713, and the job control unit 714.

In the present exemplary embodiment, the print server 104 includes the above-described functions. However, functions (functional units) related to the communication through the web network can be separately provided on another web server.

The second exemplary embodiment is different from the first exemplary embodiment because the second exemplary embodiment transmits a job to the device (the MFP 105 or the printer 106) with a job transmitting unit 723 when the job control unit 714 has resumed the job. In the job management system according to the present exemplary embodiment, a print job is instructed and transmitted from the client terminal apparatus 101 to the print server 104, which has the function of the present exemplary embodiment.

With the above-described configuration, the present exemplary embodiment can achieve a similar effect as that of the first exemplary embodiment when the job management is executed on the print server 104.

A third exemplary embodiment of the present invention will now be described in detail below. In the first exemplary embodiment, when the user has received an e-mail, the user accesses the management code inputting web page. However, the user may desire to enter the management code before receiving an e-mail or at an arbitrary timing without displaying the e-mail. The third exemplary embodiment provides a method for allowing the user to access a fixed address via the browser to display a management code entering page.

When the user has designated a predetermined URL, such as "http://accountserver.a-corporation.co.jp/bcinput," the web page generation unit 715 displays the authentication screen illustrated in FIG. 11. When the user has entered the authentication information and if the user has been successfully authenticated, then the web page generation unit 715 displays a top page illustrated in FIG. 22 (a menu list screen).

FIG. 22 illustrates an example of a menu list screen according to the third exemplary embodiment of the present invention. When the user selects a menu from the menu list illustrated in FIG. 22, the web page generation unit 715 displays a management code input waiting job list screen or a job list screen to prompt the user to enter the management code.

Figure 23:
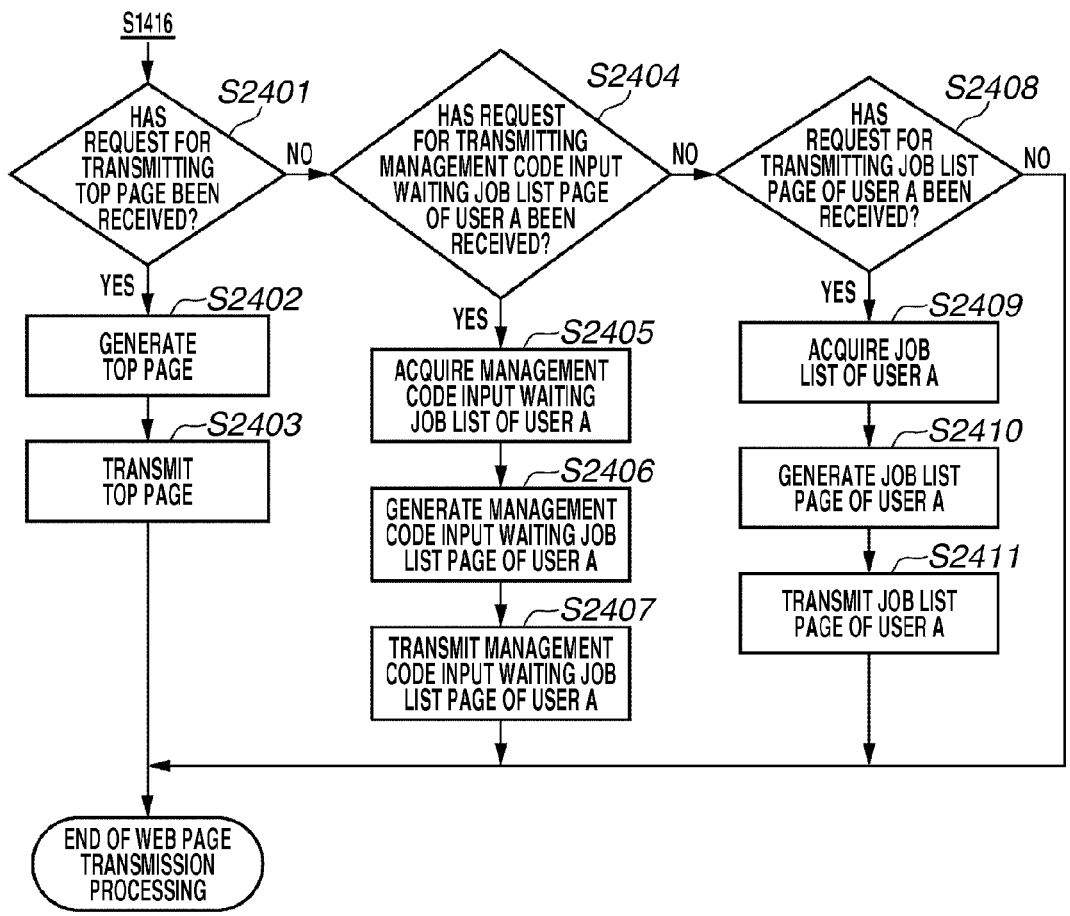
FIG. 23 is a flow chart illustrating an example of web page transmission processing according to the third exemplary embodiment of the present invention.

The above-described processing can be implemented by executing processing illustrated in the flow chart of FIG. 23 as the processing in step S1421 (FIG. 20).

FIG. 23 is a flow chart illustrating an example of web page transmission processing according to the present exemplary embodiment. Referring to FIG. 23, in step S2401, the web page generation unit 715 determines whether a request for transmitting the top page has been received.

If a request for transmitting the top page has been received (YES in step S2401), then the processing advances to step S2402. If a request for transmitting the top page has not been received (NO in step S2401), then the processing advances to step S2404.

In step S2402, the web page generation unit 715 generates a top page. In step S2403, the web page generation unit 715 transmits the generated top page to the client terminal apparatus 101.

In step S2404, the web page generation unit 715 determines whether a request for transmitting a management code input waiting job list of an authenticated user A has been issued. If a request for transmitting a management code input waiting job list of an authenticated user A has been issued (YES in step S2404), then the processing advances to step S2405. If a request for transmitting a management code input waiting job list of an authenticated user A has not been issued (NO in step S2404), then the processing advances to step S2408.

In step S2405, the web page generation unit 715 acquires the management code input waiting job list of the user A from the job management unit 713. In step S2406, the web page generation unit 715 generates a management code input waiting job list page for the user A including the acquired management code input waiting job list for the user A illustrated in FIG. 17.

In step S2407, the web page generation unit 715 transmits the generated page to the client terminal apparatus 101. In step S2408, the web page generation unit 715 determines whether a request for transmitting the job list page for the authenticated user A has been received. If a request for transmitting the job list page for the authenticated user A has been received (YES in step S2408), then the processing advances to step S2409. If a request for transmitting the job list page for the authenticated user A has not been received (NO in step S2408), then the processing in the flow chart in FIG. 23 ends.

In step S2409, the web page generation unit 715 acquires the job list for the user A from the job management unit 713. In step S2410, the web page generation unit 715 generates a page including the job list for the user A including the acquired job list for the user A, which is illustrated in FIG. 24.

In step S2411, the web page generation unit 715 transmits the generated page to the client terminal apparatus 101.

FIG. 24 illustrates an example of a job list (executed job list) screen according to the present exemplary embodiment.

With the above-described configuration, the present exemplary embodiment can allow the user to enter a management code at a desired arbitrary timing, in addition to implement the function of the first exemplary embodiment.

A fourth exemplary embodiment of the present invention will now be described in detail below. In the embodiments of the present invention, the processing advances from step S1015 (FIG. 14) to step S1016 (FIG. 14). However, the job control unit 714 can execute the following processing after the processing in step S1015 and before executing the processing in step S1016. The job control unit 714 can determine whether a dedicated tool for entering a management code has been operating on the client terminal apparatus 101 according to the information added to the job. If it is determined that a dedicated tool for entering a management code has not been operating on the client terminal apparatus 101, the processing advances to step S1016 to execute the above-described corresponding processing.

If a dedicated tool for entering a management code has been operating on the client terminal apparatus 101, then the job control unit 714 can notify and instruct the dedicated tool for entering the management code to execute processing for prompting the user to enter the management code.

The present invention can also be achieved by providing a system or a device with a computer-readable storage medium (or a recording medium) which stores program code of software implementing the functions of the embodiments and by reading and executing the program code stored in the storage medium with a computer of the system or the device (a CPU or an MPU).

The program code is read from the storage medium, implements the functions of the embodiments mentioned above, and accordingly, the storage medium storing the program code constitutes the present invention.

The functions according to the embodiments described above can be implemented not only by executing the program code read by the computer, but also implemented by the processing in which an operating system (OS) or the like carries out a part of or the whole of the actual processing based on an instruction given by the program code.

After the program code read from the storage medium is written in a memory provided in a function expansion board inserted in the computer or in a function expansion unit connected to the computer, a CPU and the like provided in the function expansion board or the function expansion unit can carry out a part of or the whole of the processing to implement the functions of the embodiments.

If the present invention is implemented on the storage medium (computer-readable storage medium), the storage medium stores program code corresponding to the above-described flow chart.

With the above-described configuration, each embodiment of the present invention can implement a method for entering an appropriate input attribute value of a job that is independent of the platform of the client terminal apparatus.

While the present invention has been described with reference to exemplary embodiments, it is to be understood that the invention is not limited to the disclosed exemplary embodiments. The scope of the following claims is accorded the broadest interpretation to encompass all modifications, equivalent structures, and functions.

This application claims priority from Japanese Patent Application No. 2008-112986 filed Apr. 23, 2008, which is hereby incorporated by reference herein in its entirety.

What is claimed is:

1. A printing control apparatus comprising:
a verification unit configured to verify a charging destination of a job generated at a client terminal apparatus;
a control unit configured to suspend execution of the job if it is determined by the verification unit that no value is set to the charging destination of the job or that an invalid value is set to the charging destination of the job;

a generation unit configured to generate an input screen for entering a value of the charging destination of the job if it is determined by the verification unit that no value is set to the charging destination of the job or that an invalid value is set to the charging destination of the job; and a notification unit configured to notify information about the input screen generated by the generation unit to the client terminal apparatus;

wherein the notification unit is configured to set location information about the input screen generated by the generation unit in a text portion of an e-mail, to set an e-mail address of the client terminal apparatus as a transmission destination of the e-mail, and to transmit the e-mail, and wherein the location information is URL information of the web page, wherein re-transmission of the e-mail is executed if a preset time for receiving a job completion notification has elapsed, wherein the generated input screen is a web page which is displayed by using a browser of the client terminal apparatus and the web page is deleted if a preset time for executing re-transmission of the e-mail has elapsed.

2. The printing control apparatus according to claim 1, further comprising:

a setting unit configured to set a value of the charging destination entered via the input screen to the job whose execution has been suspended by the control unit, wherein the control unit is configured to resume the execution of the job when the value of the charging destination is set by the setting unit to the job whose execution has been suspended.

3. The printing control apparatus according to claim 1, wherein the verification unit is configured to determine a value set to the charging destination of the job to be valid if the value can be used by a user who is an owner of the job, and to determine the value set to the charging destination of the job to be invalid if the value cannot be used by the user.

4. The printing control apparatus according to claim 1, wherein, if it is determined by the verification unit that no value is set to the charging destination of the job or that an invalid value is set to the charging destination of the job, the generation unit is configured to generate an input screen for entering a value of the charging destination with respect to all jobs to whose charging destination no value is set or an invalid value is set, of jobs whose owner is the same as the owner of the job verified by the verification unit and that have been stored on the printing control apparatus.

5. The printing control apparatus according to claim 1, wherein, if it is determined by the verification unit that a valid value is set to the charging destination of the job, the control unit is configured to execute the job.

6. The printing control apparatus according to claim 1, further comprising:

a job execution unit configured to execute the job.

7. A printing control apparatus comprising:

a verification unit configured to verify a charging destination of a job generated at a client terminal apparatus;

a control unit configured to suspend execution of the job if it is determined by the verification unit that no value is set to the charging destination of the job;

a generation unit configured to, if it is determined by the verification unit that no value is set to the charging destination of the job, generate an input screen for entering a value of the charging destination with respect to all jobs to whose charging destination no value is set, of jobs whose owner is the same as the owner of the job verified by the verification unit and that have been stored on the printing control apparatus; and a notification unit configured to notify information about the input screen generated by the generation unit to the client terminal apparatus, wherein the notification unit is configured to set location information about the input screen generated by the generation unit in a text portion of an e-mail, to set an e-mail address of the client terminal apparatus as a transmission destination of the e-mail, and to transmit the e-mail, and wherein the location information is URL information of the web page, wherein re-transmission of the e-mail is executed if a preset time for receiving a job completion notification has elapsed, wherein the generated input screen is a web page which is displayed by using a browser of the client terminal apparatus and the web page is deleted if a preset time for executing re-transmission of the e-mail has elapsed.

8. A printing control method for a printing control apparatus, the printing control method comprising:

verifying a charging destination of a job generated at a client terminal apparatus;

suspending execution of the job if it is determined that no value is set to the charging destination of the job or that an invalid value is set to the charging destination of the job;

generating an input screen for entering a value of the charging destination of the job if it is determined that no value is set to the charging destination of the job or that an invalid value is set to the charging destination of the job; and notifying information about the generated input screen to the client terminal apparatus, wherein the notifying is configured to set location information about the input screen generated in a text portion of an e-mail, to set an e-mail address of the client terminal apparatus as a transmission destination of the e-mail, and to transmit the e-mail, and wherein the location information is URL information of the web page, wherein re-transmission of the e-mail is executed if a preset time for receiving a job completion notification has elapsed, wherein the generated input screen is a web page which is displayed by using a browser of the client terminal apparatus and the web page is deleted if a preset time for executing re-transmission of the e-mail has elapsed.

9. The printing control method according to claim 8, further comprising:

setting a value of the charging destination entered via the input screen to the job whose execution has been suspended; and resuming the execution of the job when the value of the charging destination is set to the job whose execution has been suspended.

10. The printing control method according to claim 8, further comprising:

determining a value set to the charging destination of the job to be valid if the value can be used by a user who is an owner of the job and determining the value set to the charging destination of the job to be invalid if the value cannot be used by the user.

11. The printing control method according to claim 8, further comprising:

if it is determined that no value is set to the charging destination of the job or that an invalid value is set to the charging destination of the job, generating an input screen for entering a value of the charging destination with respect to all jobs to whose charging destination no value is set or an invalid value is set, of jobs whose owner is the same as the owner of the verified job and that have been stored on the printing control apparatus.

12. The printing control method according to claim 8, further comprising:
executing the job if it is determined that a valid value is set to the charging destination of the job.

13. A printing control method comprising:
verifying a charging destination of a job generated at a client terminal apparatus;
suspending execution of the job if it is determined that no value is set to the charging destination of the job;
generating, if it is determined that no value is set to the charging destination of the job, an input screen for entering a value of the charging destination with respect to all jobs to whose charging destination no value is set, of jobs whose owner is the same as the owner of the verified job and that have been stored on the printing control apparatus; and
notifying information about the generated input screen to the client terminal apparatus,
wherein the notifying is configured to set location information about the input screen generated in a text portion of an e-mail, to set an e-mail address of the client terminal apparatus as a transmission destination of the e-mail, and to transmit the e-mail, and wherein the location information is URL information of the web page,
wherein re-transmission of the e-mail is executed if a preset time for receiving a job completion notification has elapsed,
wherein the generated input screen is a web page which is displayed by using a browser of the client terminal apparatus and the web page is deleted if a preset time for executing re-transmission of the e-mail has elapsed.

14. A non-transitory computer-readable storage medium storing instructions which, when executed by a computer, cause the computer to perform operations comprising:
verifying a charging destination of a job generated at a client terminal apparatus;
suspending execution of the job if it is determined that no value is set to the charging destination of the job or that an invalid value is set to the charging destination of the job;
generating an input screen for entering a value of the charging destination of the job if it is determined that no value is set to the charging destination of the job or that an invalid value is set to the charging destination of the job; and
notifying information about the generated input screen to the client terminal apparatus, wherein the generated input screen is a web page which is displayed by using a browser of the client terminal apparatus,
wherein the notifying is configured to set location information about the input screen generated in a text portion of an e-mail, to set an e-mail address of the client terminal apparatus as a transmission destination of the e-mail, and to transmit the e-mail, and wherein the location information is URL information of the web page,
wherein re-transmission of the e-mail is executed if a preset time for receiving a job completion notification has elapsed,
wherein the generated input screen is a web page which is displayed by using a browser of the client terminal apparatus and the web page is deleted if a preset time for executing re-transmission of the email has elapsed.

15. A non-transitory computer-readable storage medium storing instructions which, when executed by a computer, cause the computer to perform operations comprising:
verifying a charging destination of a job generated at a client terminal apparatus;
suspending execution of the job if it is determined that no value is set to the charging destination of the job;
generating, if it is determined that no value is set to the charging destination of the job, an input screen for entering a value of the charging destination with respect to all jobs to whose charging destination no value is set, of jobs whose owner is the same as the owner of the verified job and that have been stored on the printing control apparatus; and
notifying information about the generated input screen to the client terminal apparatus,
wherein the notifying is configured to set location information about the input screen generated in a text portion of an e-mail, to set an e-mail address of the client terminal apparatus as a transmission destination of the e-mail, and to transmit the e-mail, and wherein the location information is URL information of the web page,
wherein re-transmission of the e-mail is executed if a preset time for receiving a job completion notification has elapsed,
wherein the generated input screen is a web page which is displayed by using a browser of the client terminal apparatus and the web page is deleted if a preset time for executing re-transmission of the email has elapsed.

* * * * *